US012212088B2

(12) United States Patent
Tamaki

(10) Patent No.: US 12,212,088 B2
(45) Date of Patent: Jan. 28, 2025

(54) CONNECTOR CAPABLE OF ACCOMMODATING MISALIGNMENT AT TIME OF COUNTERPART TERMINAL INSERTION

(71) Applicant: Hirose Electric Co., Ltd., Kanagawa (JP)

(72) Inventor: Shoichiro Tamaki, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 494 days.

(21) Appl. No.: 17/561,871

(22) Filed: Dec. 24, 2021

(65) Prior Publication Data

US 2022/0209448 A1 Jun. 30, 2022

(30) Foreign Application Priority Data

Dec. 28, 2020 (JP) ................................ 2020-218845

(51) Int. Cl.

*H01R 13/10* (2006.01)
*H01R 12/70* (2011.01)
*H01R 12/71* (2011.01)
*H01R 13/11* (2006.01)

(52) U.S. Cl.

CPC ....... *H01R 13/114* (2013.01); *H01R 12/7047* (2013.01); *H01R 12/716* (2013.01)

(58) Field of Classification Search

CPC ...... H01R 13/114; H01R 13/11; H01R 13/10; H01R 13/04; H01R 13/02; H01R 13/193; H01R 12/7047; H01R 12/716; H01R 12/712; H01R 12/71

See application file for complete search history.

(56) References Cited

U.S. PATENT DOCUMENTS 9,397,432 B2 * 7/2016 Yukutake ............... H01R 13/46
9,799,971 B2 * 10/2017 Ninomiya .............. H01R 12/73
9,997,854 B2 * 6/2018 Kobayashi ........... H01R 13/502
10,096,914 B1 10/2018 Kuo et al.

(Continued)

FOREIGN PATENT DOCUMENTS

JP 2000-150051 A 5/2000
JP 2013-152801 A 8/2013

(Continued)

*Primary Examiner* — Harshad C Patel
(74) *Attorney, Agent, or Firm* — Procopio, Cory Hargreaves & Savitch LLP

(57) ABSTRACT

A housing having a height, width, and a depth direction, and cantilevered terminals having one end side secured to the housing on one side in the depth direction and having a resilient member forming a free end in an end portion on the other end side opposite to said one end side on the side opposite to the one side in the depth direction. Counterpart terminals are inserted into an insertion space within the housing from locations spaced apart in the height direction through insertion apertures occupying a predetermined area in a plane formed by the depth direction and width direction of the housing, the resilient member has contact points that contact with counterpart terminals inserted through the insertion apertures, and at least a portion of the resilient member other than the contact points, along with the contact points, is positioned within the bounds of the predetermined area in at least the plane.

14 Claims, 28 Drawing Sheets

(56) References Cited

U.S. PATENT DOCUMENTS

| | | | | |
|---|---|---|---|---|
| 10,193,260 | B1 * | 1/2019 | Suzuki | H01R 13/2457 |
| 10,608,361 | B2 * | 3/2020 | Teruki | H01R 13/506 |
| 10,630,026 | B2 * | 4/2020 | Suzuki | H01R 13/6315 |
| 10,686,273 | B2 * | 6/2020 | Ogura | H01R 13/502 |
| 11,239,591 | B2 * | 2/2022 | Morita | H01R 12/737 |
| 11,362,461 | B2 * | 6/2022 | Tamaki | H01R 43/16 |
| 11,552,421 | B2 * | 1/2023 | Morita | H01R 12/73 |
| 2012/0142226 | A1 * | 6/2012 | Funayama | H01R 12/73 439/862 |
| 2014/0342614 | A1 * | 11/2014 | Yukutake | H01R 13/6315 439/626 |

FOREIGN PATENT DOCUMENTS

| | | | |
|---|---|---|---|
| JP | 2014-011079 | A | 1/2014 |
| JP | 2014-026855 | A | 2/2014 |
| JP | 5606588 | B2 | 10/2014 |
| JP | 2014-229407 | A | 12/2014 |
| JP | 2017-098160 | A | 6/2017 |
| JP | 2017-135020 | A | 8/2017 |
| JP | 2018-015072 | A | 2/2018 |
| JP | 2019-021542 | A | 2/2019 |
| JP | 2020-202012 | A | 12/2020 |
| JP | 2022-142858 | A | 10/2022 |

* cited by examiner (m)

(n)

(m)

(n)

CONNECTOR CAPABLE OF ACCOMMODATING MISALIGNMENT AT TIME OF COUNTERPART TERMINAL INSERTION

CROSS-REFERENCE TO RELATED APPLICATIONS

This application claims priority to Japanese Patent Application No. 2020-218845, filed Dec. 28, 2020, the contents of which are incorporated herein by reference in its entirety for all purposes.

BACKGROUND

Technical Field

The present invention relates to a connector capable of accommodating misalignment at the time of counterpart terminal insertion.

Related Art

An exemplary conventional connector of the above-mentioned type has been disclosed in Patent Document 1.

In this conventional connector, a movable housing is secured to one end side of the terminals and a stationary housing is secured to the other end side of the terminals, with the movable housing enabled for movement relative to said stationary housing as a result of resilient deformation of the terminals.

Such movement of the movable housing relative to the stationary housing is useful in accommodating misalignment relative to a counterpart connector caused by vibration or shock at the time of connection to the counterpart connector.

PATENT DOCUMENTS

Patent Document 1

Japanese Patent No. 5,606,588

SUMMARY

Problems to be Solved

It is an object to eliminate the need for a movable housing to be provided in order to accommodate misalignment at the time of counterpart terminal insertion.

In the above-mentioned conventional connector, a movable housing was provided in addition to a stationary housing in order to accommodate misalignment at the time of counterpart terminal insertion. In addition, the problem with the above-mentioned conventional configuration was that since the movable housing was supported on the stationary housing essentially by the terminals alone, considerable loads were likely to be applied to the terminals by the weight of the movable housing, as a result of which the resistance of the terminals against significant shock or vibration was insufficient.

It is an object of the invention to provide a connector in which the above-described drawbacks are eliminated.

Technical Solution

In order to eliminate the above-mentioned problems, a connector according to one aspect of the present invention, which comprises a housing having a height direction, a width direction, and a depth direction, and cantilevered terminals having one end side secured to the housing on one side in the depth direction and having a resilient member forming a free end in an end portion on the other end side opposite to said one end side on the side opposite to the one side in the depth direction, is characterized by the fact that the counterpart terminals are configured to be inserted into an insertion space within the housing from locations spaced apart in the height direction through insertion apertures occupying a predetermined area in a plane formed by the depth direction and width direction of the housing, the resilient member has contact points that make contact with counterpart terminals inserted through the insertion apertures, and at least a portion of the resilient member other than the contact points, along with the contact points, is positioned within the bounds of the predetermined area in at least the above-mentioned plane.

The effect of the connector according to this aspect consists in eliminating the movable housing, which makes it possible to alleviate the load applied to the terminals and allows for the durability of the terminals to be improved. In addition, since there is no longer need to provide a movable housing, the construction can be streamlined and the number of parts can be minimized, as a result of which manufacturing costs can also be reduced.

Technical Effect

The present invention can provide a connector in which the drawbacks of conventional connectors are eliminated.

A top perspective view of the connector according to the first embodiment of the present invention.

FIG. 2

Figure 1:
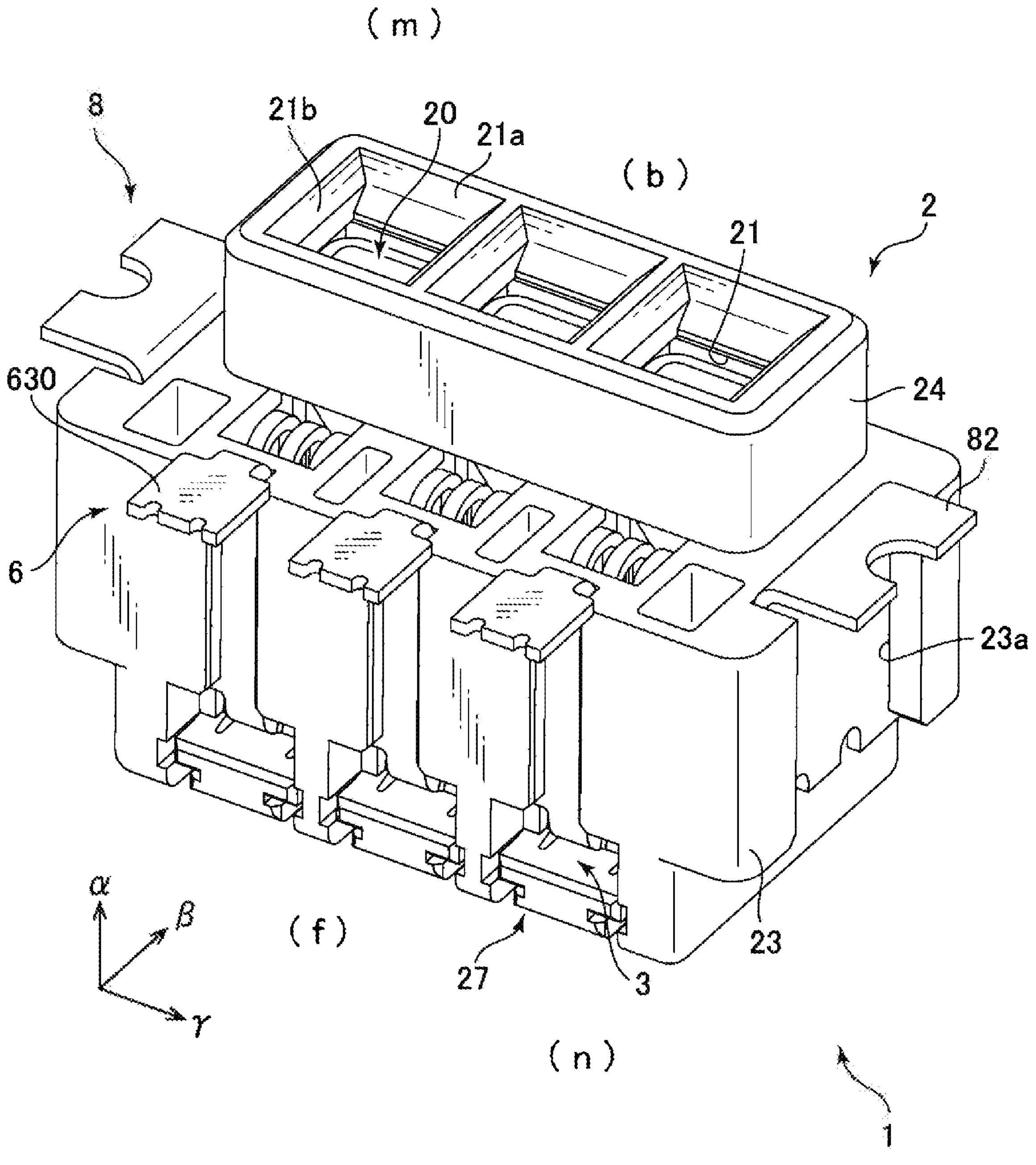
FIG. 1

An exploded perspective view of the connector of FIG. 1.

FIG. 3

A plan view of the connector of FIG. 1.

FIG. 4

Figure 3:
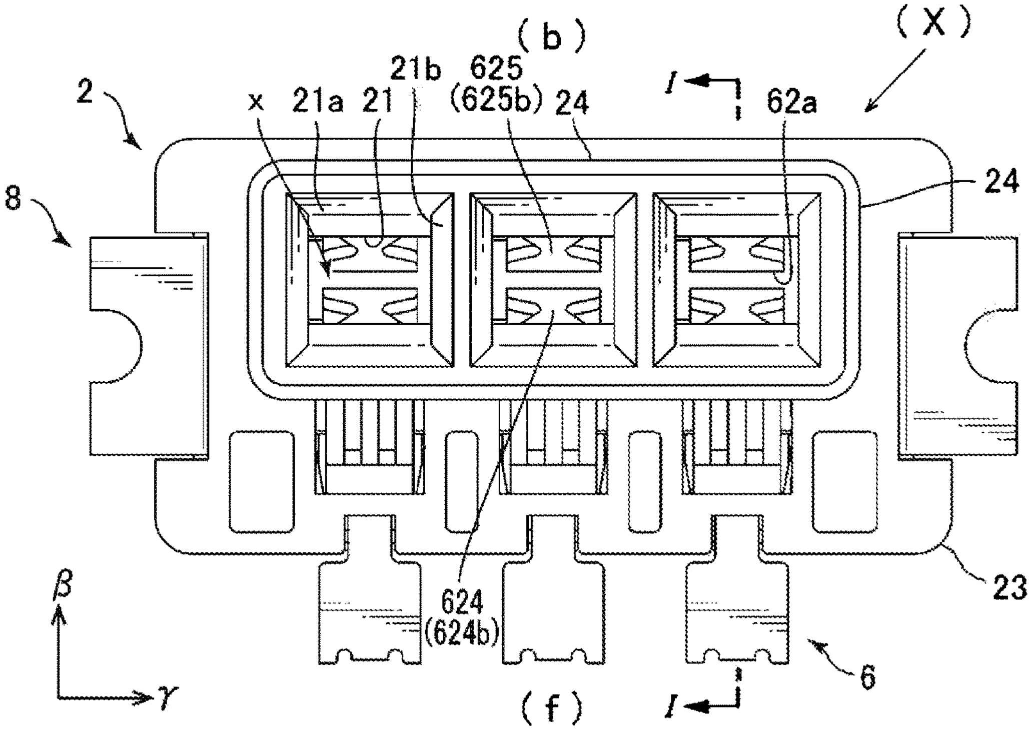

A cross-sectional view taken along line IV-IV in FIG. 3.

FIG. 5

A bottom view of the connector of FIG. 1.

FIG. 6

A rear view showing the connector as secured to a board.

FIG. 7

A perspective view of the main body of the housing.

FIG. 8

Figure 7:
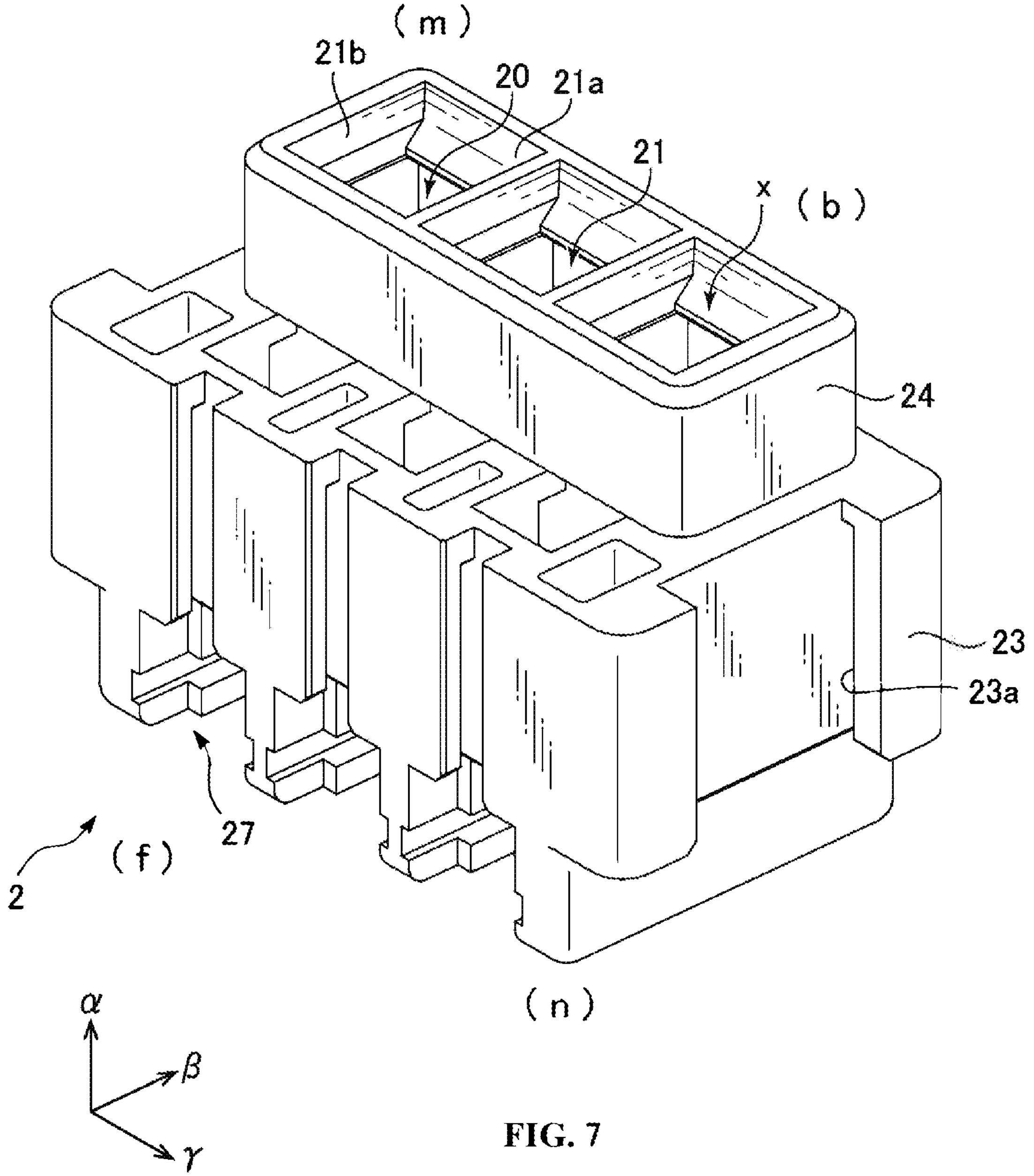

A plan view of the main body of the housing of FIG. 7.

FIG. 9

A bottom view of the main body of the housing of FIG. 7.

FIG. 10

A top perspective view of a lid-shaped member.

FIG. 11

Figure 10:
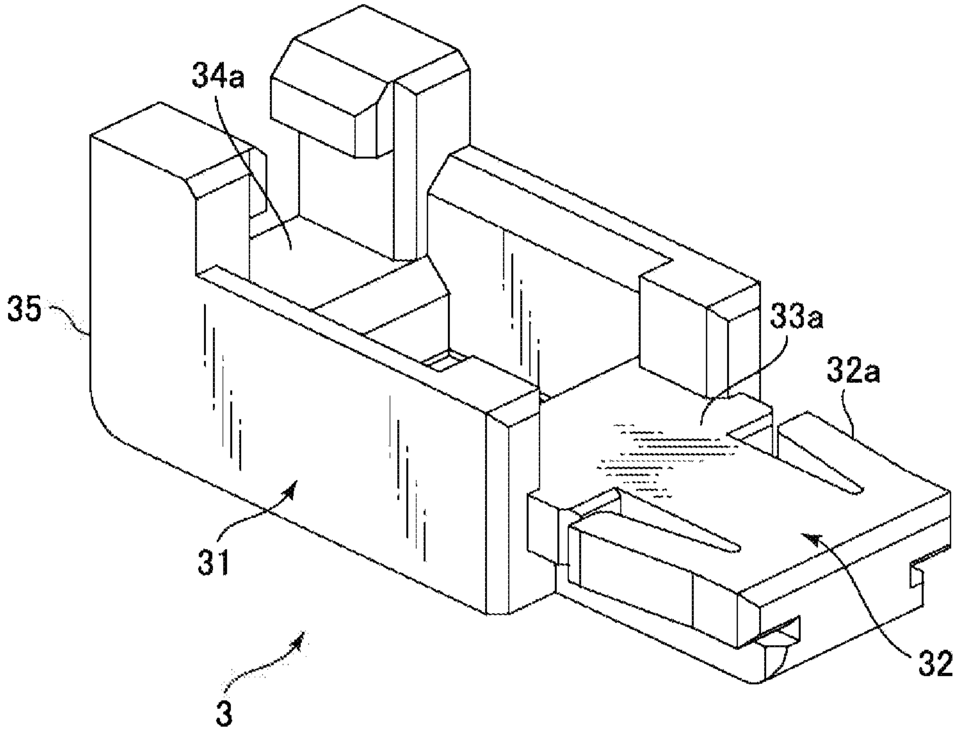

A bottom perspective view of the lid-shaped member of FIG. 10.

FIG. 12

Figure 6:
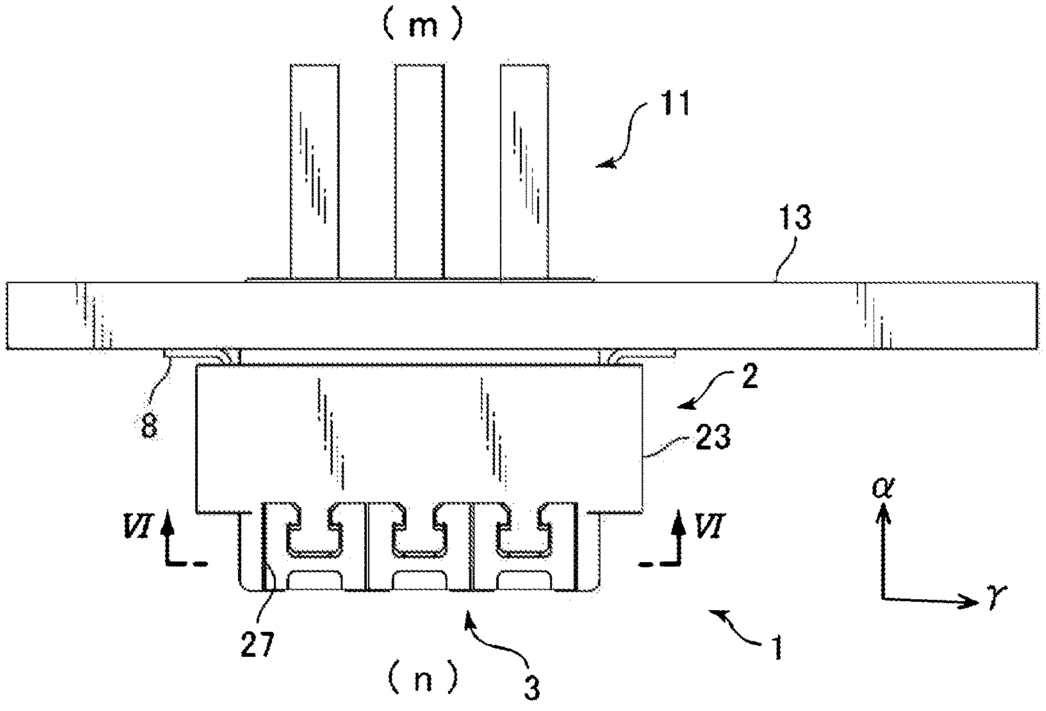

A cross-sectional view taken along line VI-VI in FIG. 6.

FIG. 13

A top perspective view of a terminal.

FIG. 14

Figure 13:
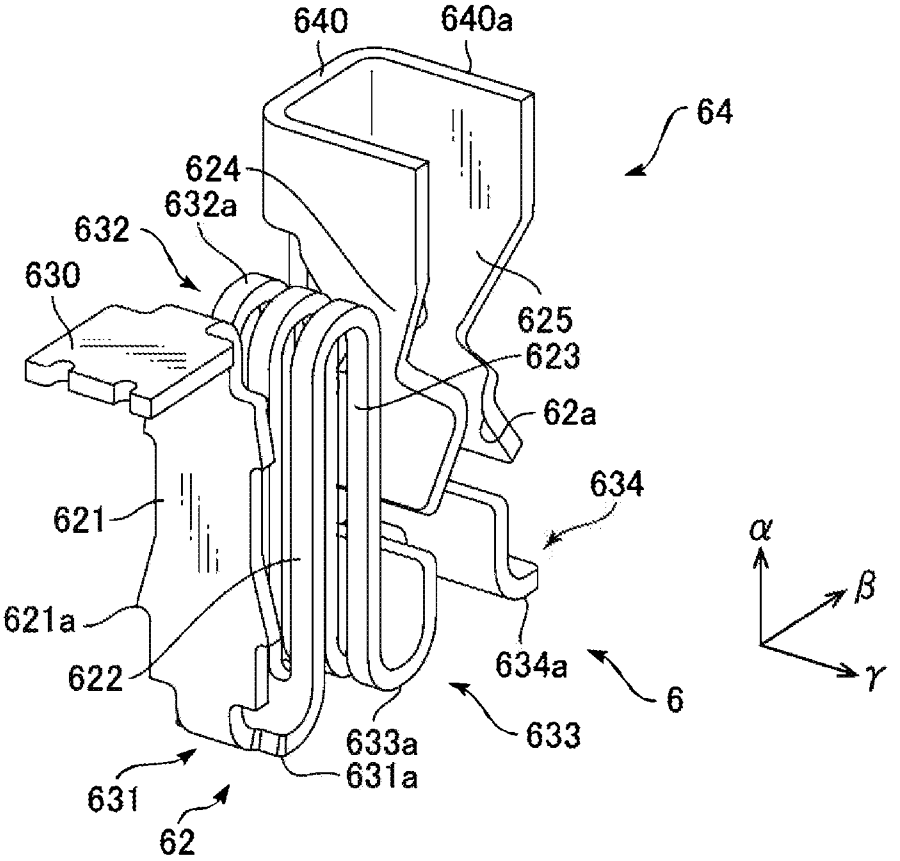

A bottom perspective view of the terminal of FIG. 13.

FIG. 15

A lateral view of the terminal of FIG. 13.

FIG. 16

A plan view of the terminal of FIG. 13.

FIG. 17

A view illustrating an exemplary mode of use of the connector.

FIG. 18

A view illustrating an exemplary mode of use of the connector.

FIG. 19

A view illustrating a configuration intended for preventing excessive displacement of the resilient member.

FIG. 20

A view illustrating a configuration intended for preventing excessive displacement of the resilient member.

FIG. 21

A top perspective view of a connector according to a second embodiment of the present invention.

FIG. 22

Figure 21:
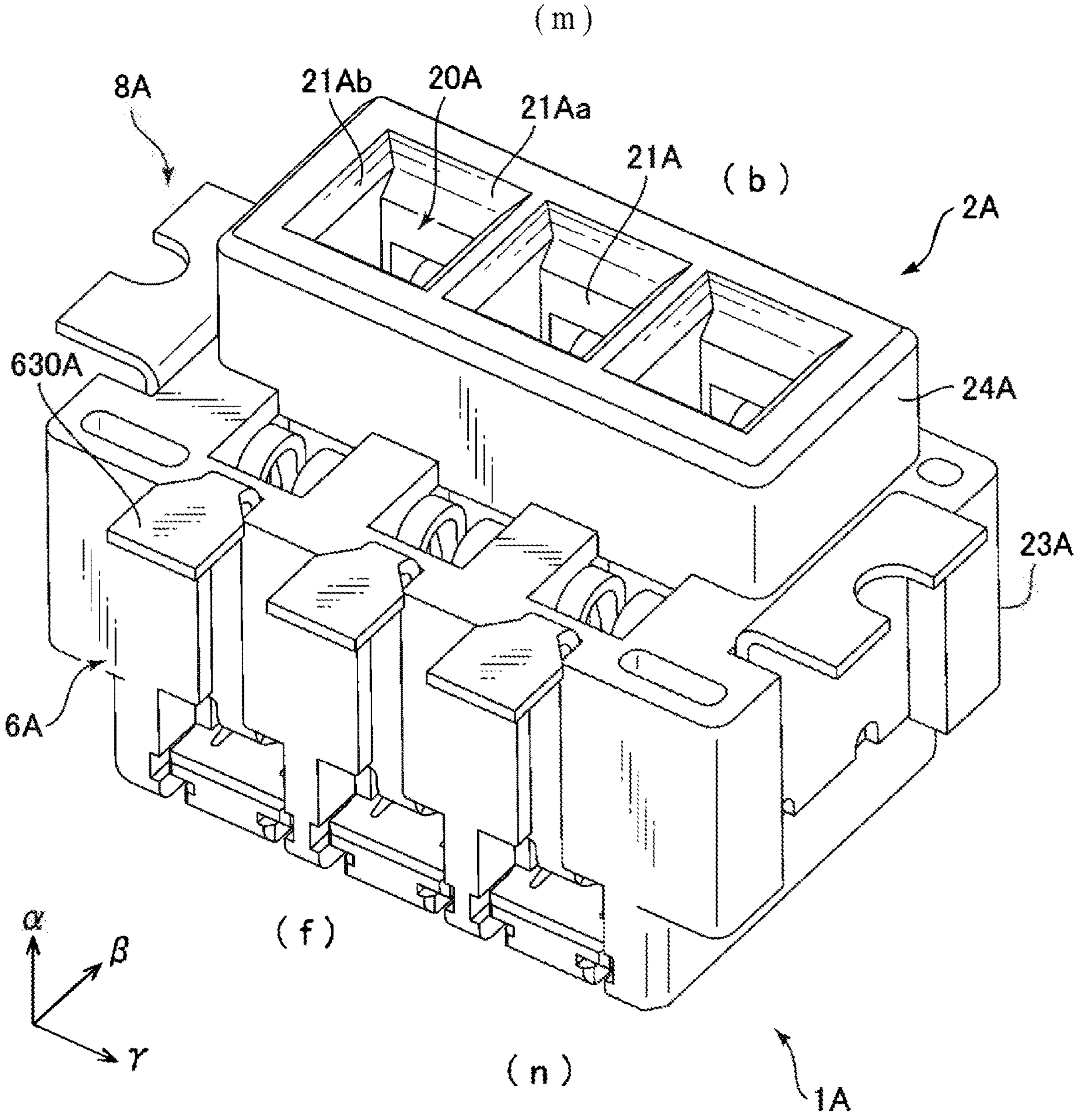

A plan view of the connector of FIG. 21.

FIG. 23

A cross-sectional view taken along line XXIII-XXIII in FIG. 21.

FIG. 24

A bottom view of the connector of FIG. 21.

FIG. 25

A perspective view of the main body of the housing.

FIG. 26

Figure 25:
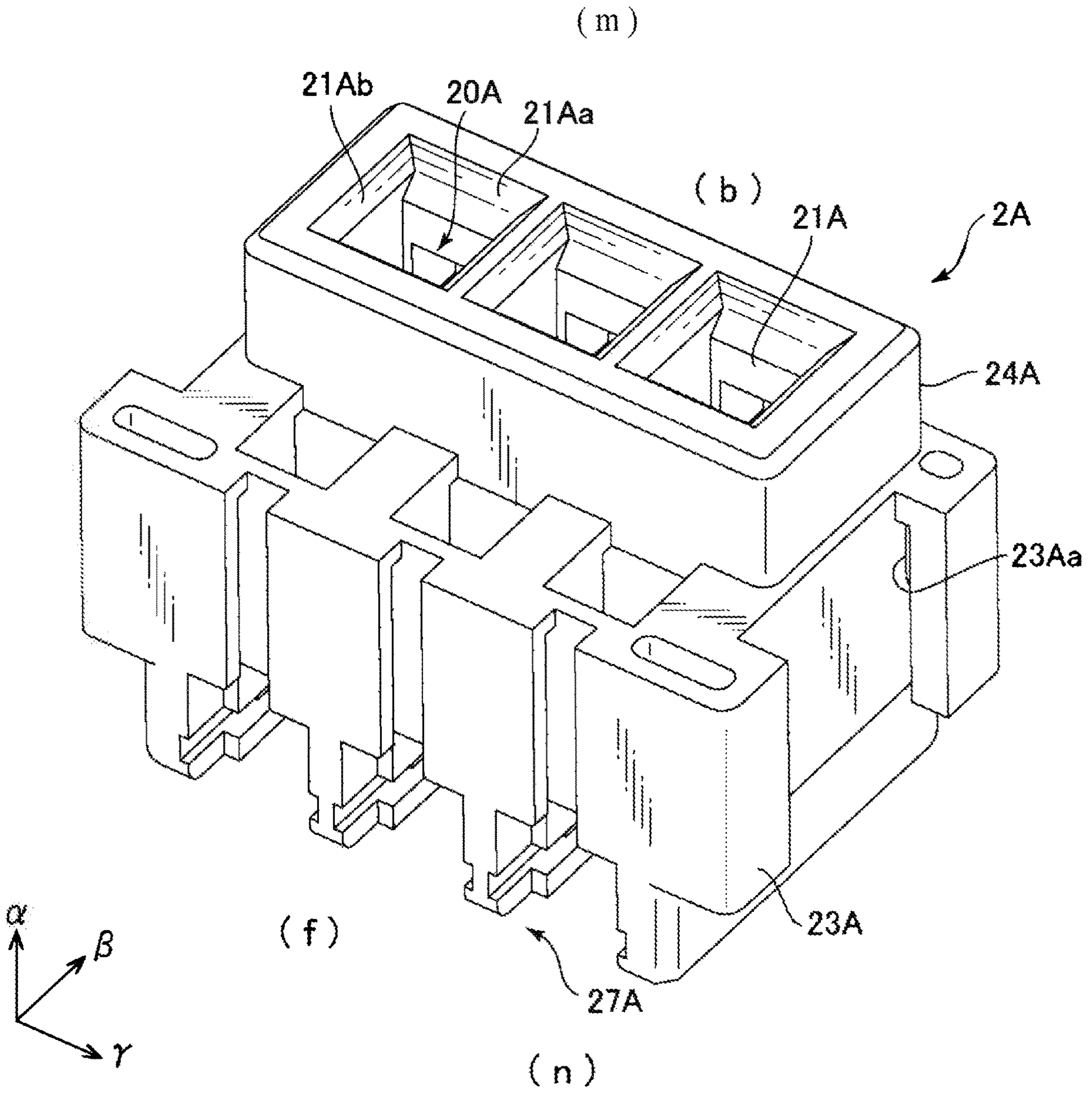

A plan view of the main body of the housing of FIG. 25.

FIG. 27

A bottom view of the main body of the housing of FIG. 25.

FIG. 28

A top perspective view of a lid-shaped member.

FIG. 29

Figure 28:
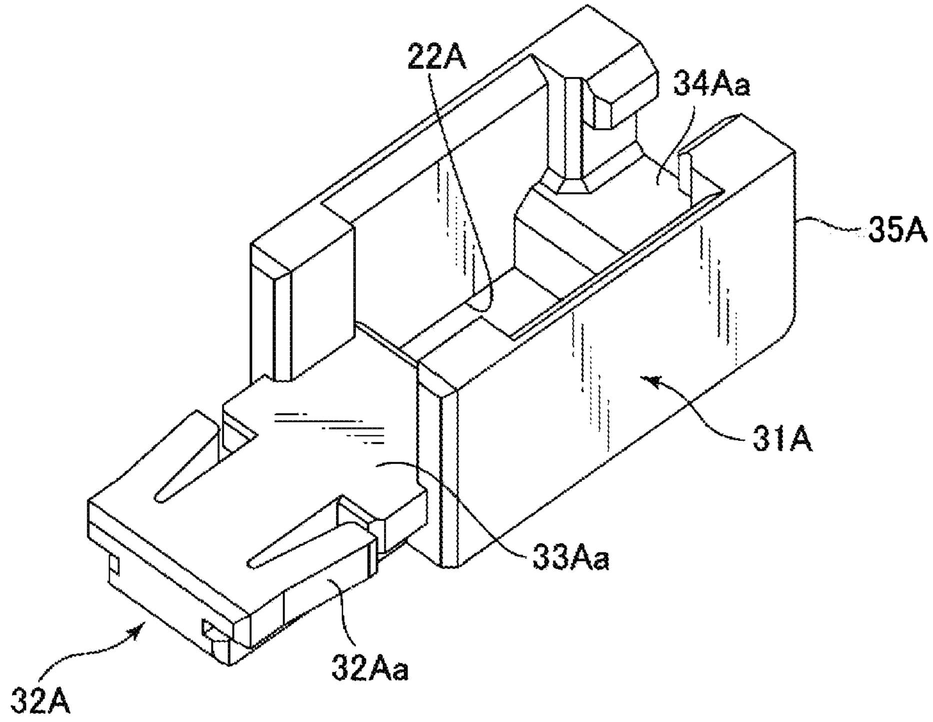

A bottom perspective view of the lid-shaped member of FIG. 28.

FIG. 30

A top perspective view of a terminal.

FIG. 31

Figure 30:
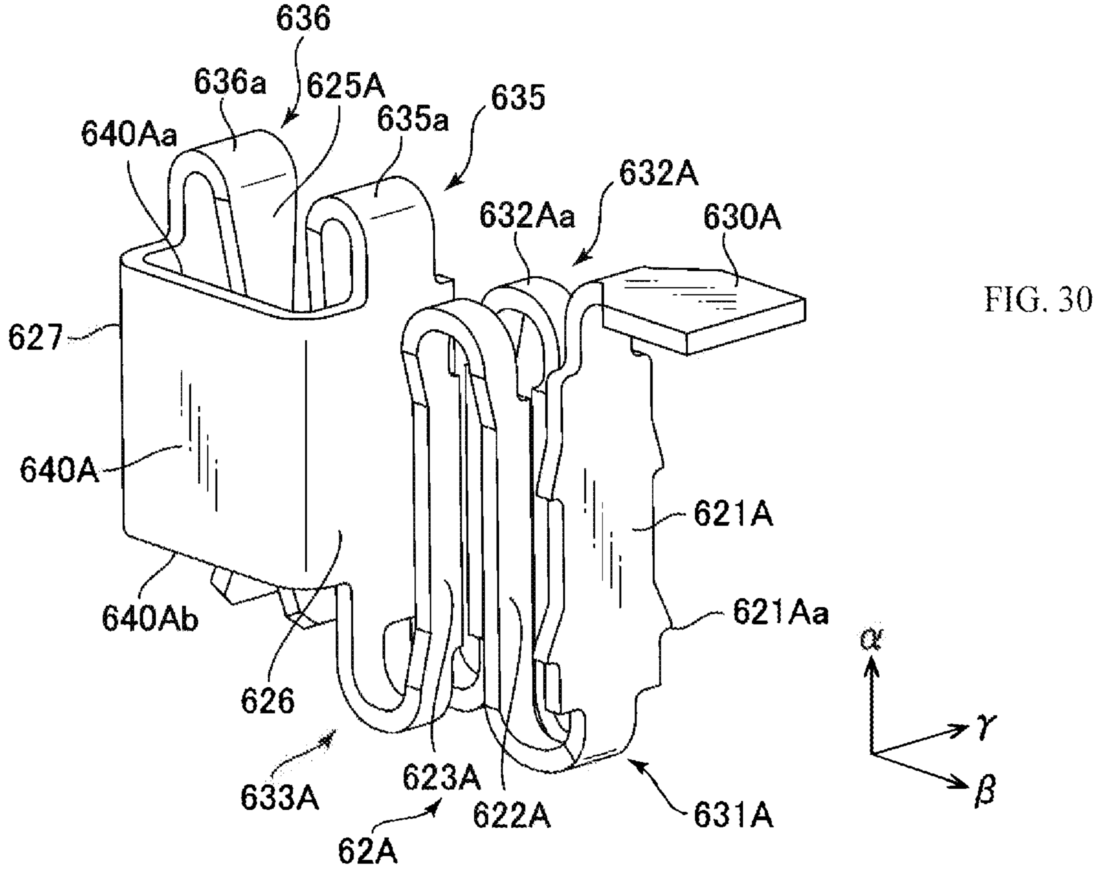

A top perspective view of the terminal of FIG. 30.

FIG. 32

A bottom perspective view of the terminal of FIG. 30.

FIG. 33

A lateral view of the terminal of FIG. 30.

FIG. 34

A plan view of the terminal of FIG. 30.

FIG. 35

A view illustrating an exemplary mode of use of the connector.

FIG. 36

A top perspective view of the connector according to a reference example.

FIG. 37

Figure 36:
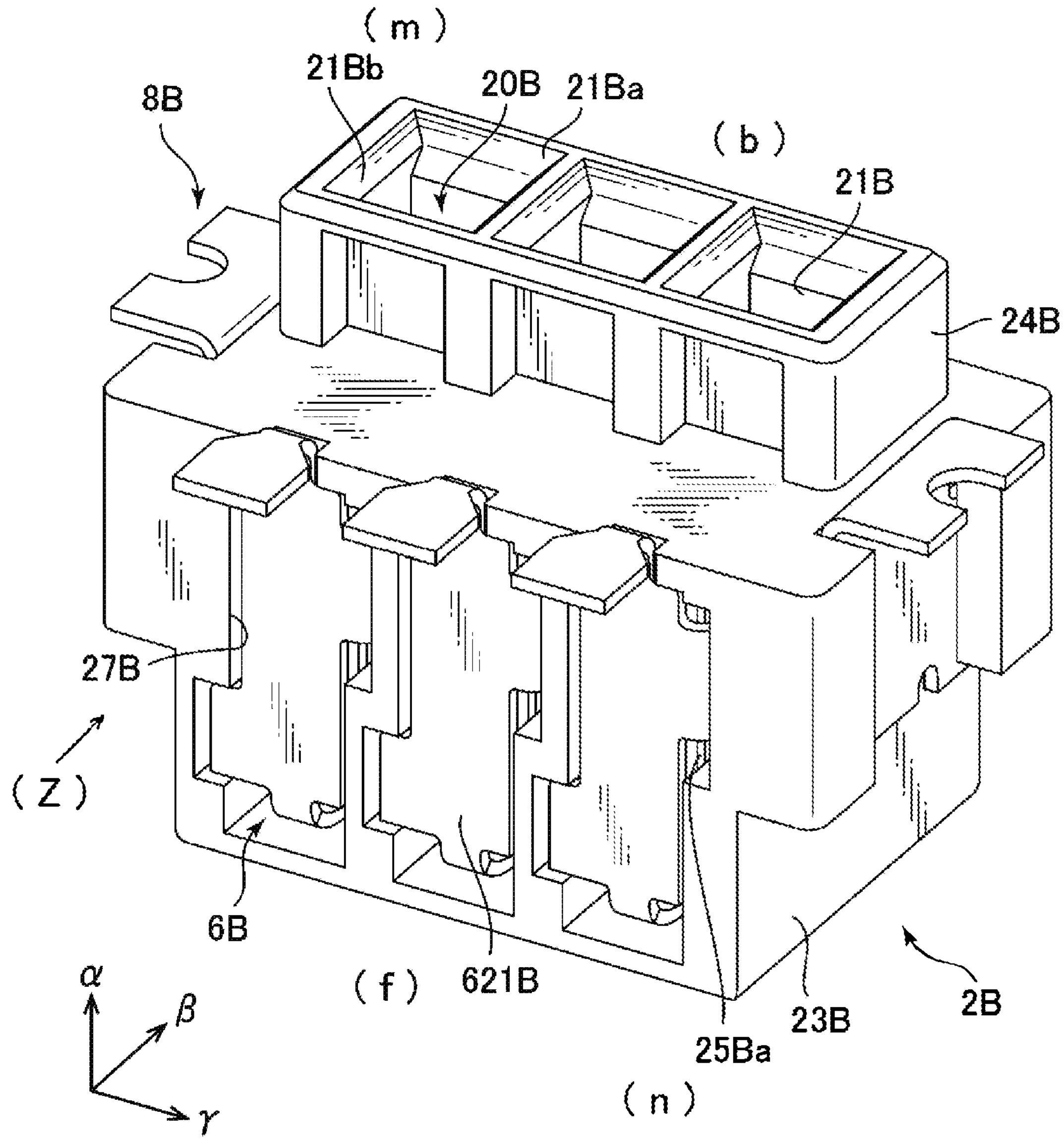

An exploded perspective view of the connector of FIG. 36.

FIG. 38

A plan view of the connector of FIG. 36.

FIG. 39

A bottom view of the connector of FIG. 36.

FIG. 40

A plan view of the housing.

FIG. 41

Figure 40:
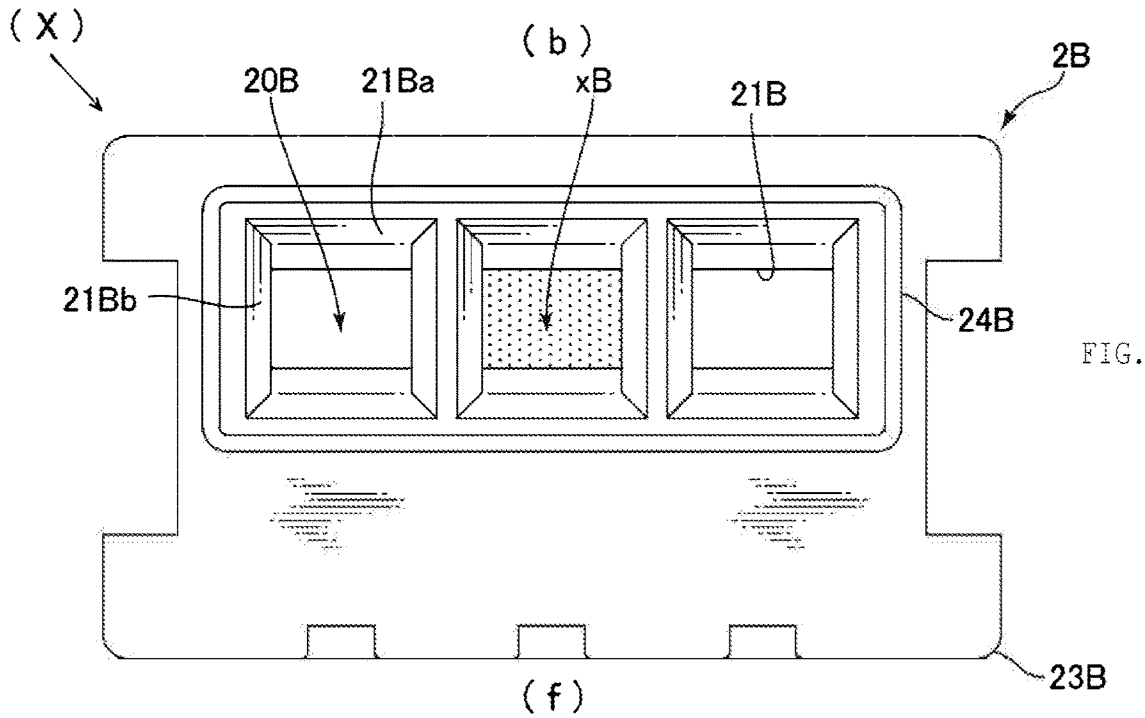

A bottom view of the housing of FIG. 40.

FIG. 42

A top perspective view of a terminal.

FIG. 43

A lateral view of the terminal of FIG. 40.

FIG. 44

A plan view of the terminal of FIG. 40.

FIG. 45

A bottom view of the terminal of FIG. 40.

FIG. 46

A view illustrating an exemplary mode of use of the connector.

FIG. 47

A view illustrating an exemplary mode of use of the connector.

DETAILED DESCRIPTION

Exemplary embodiments used to practice the present invention will be described in detail below with reference to drawings. However, the materials, dimensions, and shapes, as well as the relative positions of the components, etc., described in the following embodiments, are discretionary and can be modified in accordance with the configuration of the device used to practice the present invention or depending on various conditions. In addition, unless specifically stated otherwise, the scope of the present invention is not limited to the embodiments specifically described hereinbelow.

First Embodiment

Figure 2:
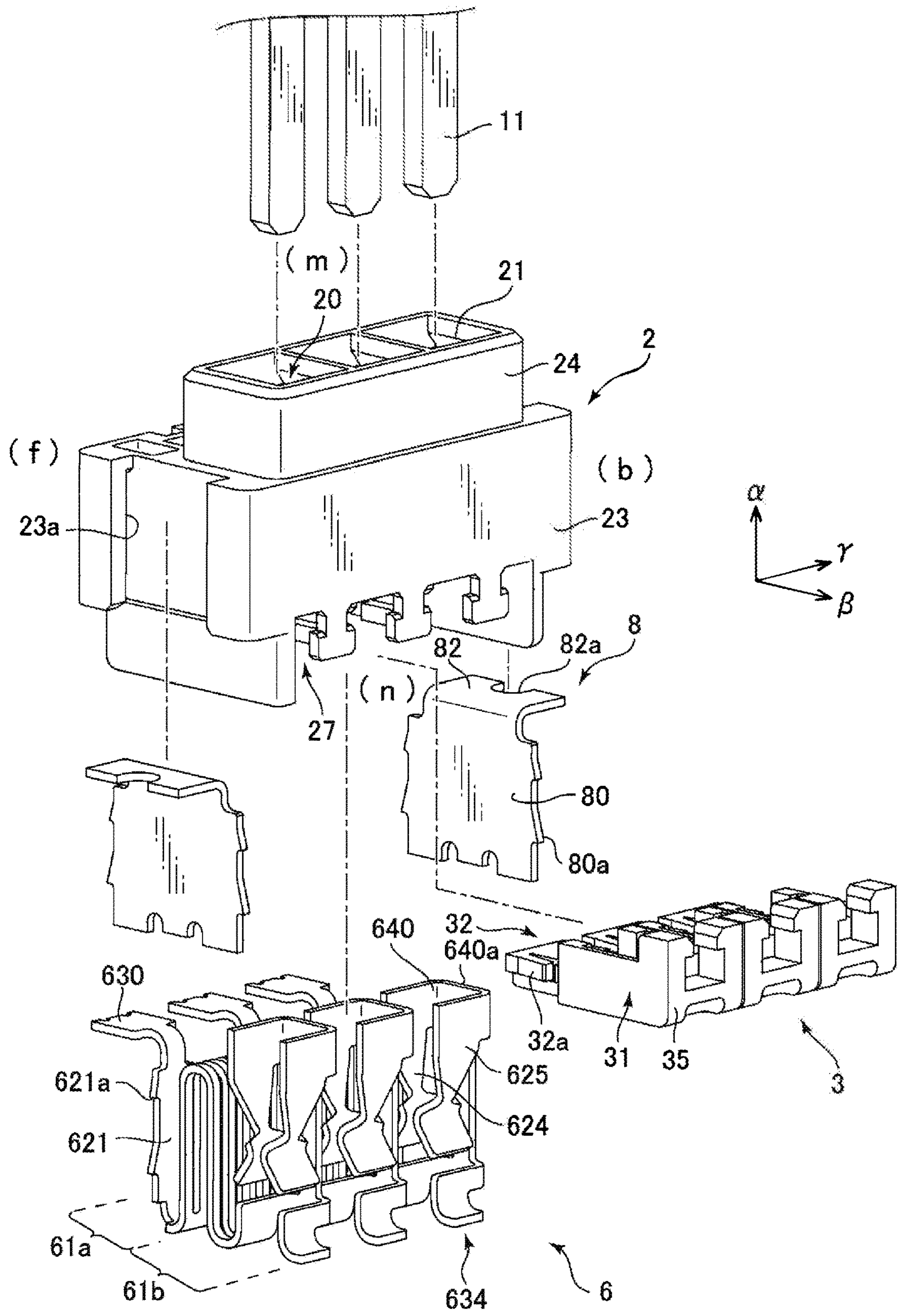
Figure 4:
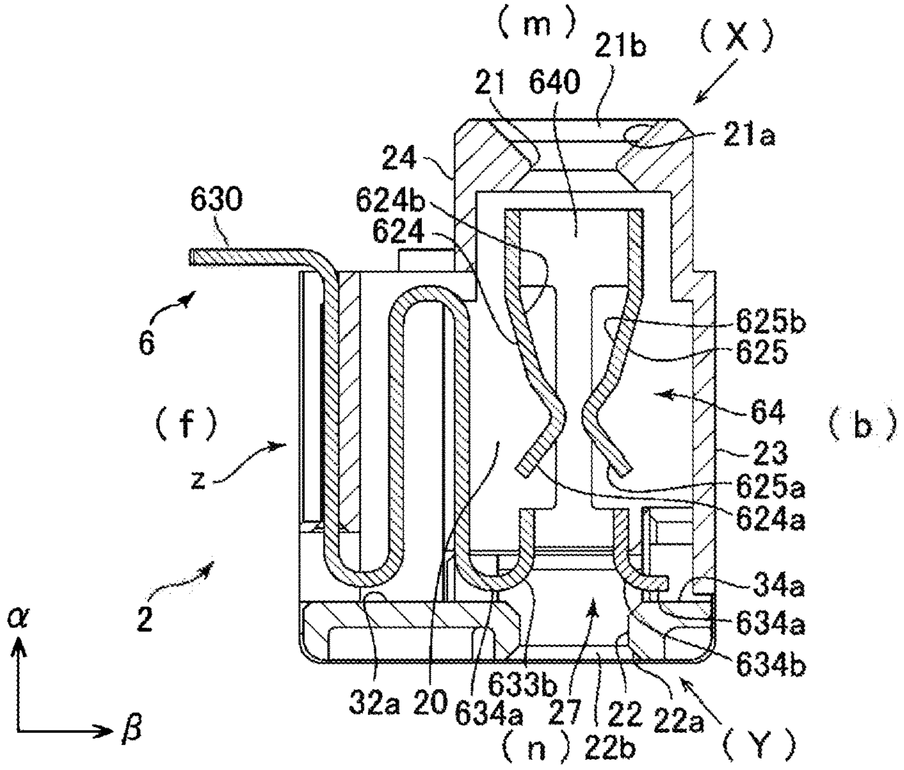
Figure 5:
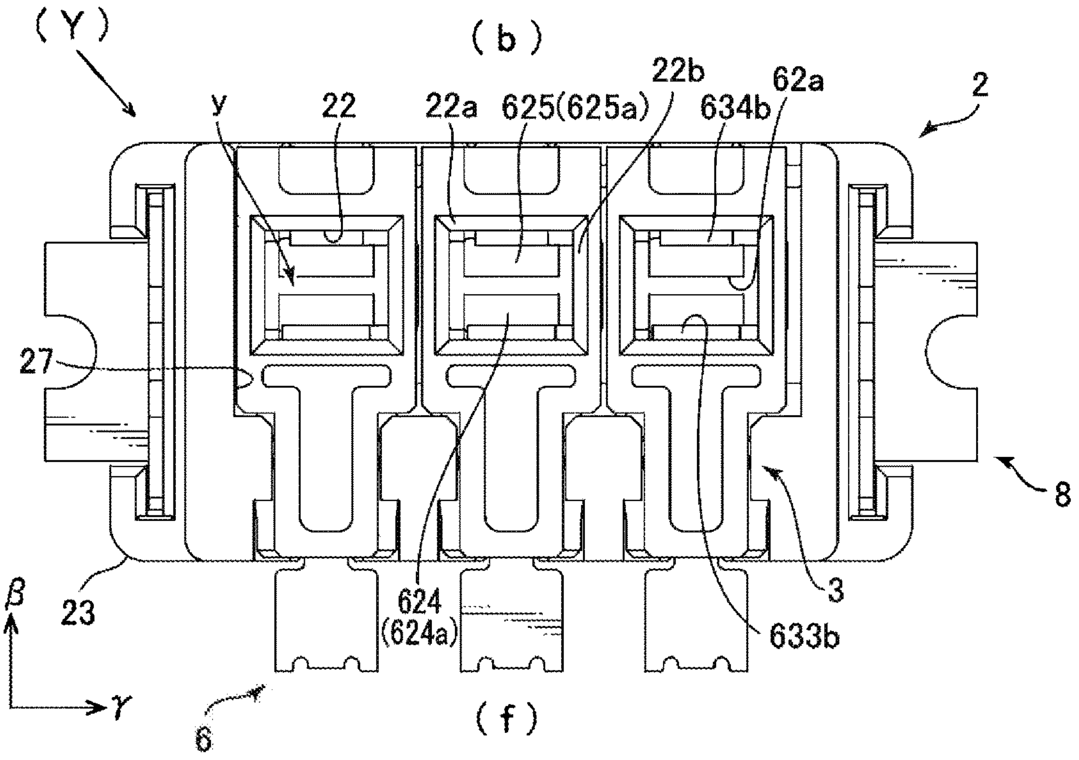

A top perspective view of a connector 1 according to a first embodiment of the present invention 1 is illustrated in FIG. 1, an exploded perspective view of the connector of FIG. 1 is illustrated in FIG. 2, a plan view thereof is illustrated in FIG. 3, a cross-sectional view taken along line IV-IV in FIG. 3 is illustrated in FIG. 4, a bottom view thereof is illustrated in FIG. 5, and, furthermore, a rear view of an exemplary mode of use of the connector 1 is illustrated in FIG. 6.

On the whole, the connector 1 has a generally cuboid shape and includes a housing (2, 3) as well as terminals 6 and anchor fittings 8 secured to the housing (2, 3). Although there are only three terminals 6 provided in the present embodiment, the number is not limited to three, and may be either smaller or greater than three. The array direction of the terminals 6 coincides with the width direction "γ" of the housing (2, 3).

As shown in FIG. 6, in actual use, the connector 1 is employed while being attached to a fixed member, such as a board 13 or an enclosure (not shown). Attachment to a board 13 and the like can be accomplished primarily with the help of the anchor fittings 8 attached to the housing (2, 3) and, furthermore, the anchoring portions 630 of the terminals 6 can also be used. The anchor fittings 8 include a base portion 80 and a threaded portion 82, with these portions jointly forming a generally L-shaped configuration when viewed from the side. In order to secure the anchor fittings 8 to the housing (2, 3), outwardly protruding press-fit projections 80*a* are respectively provided on the opposite sides of the base portion 80. When the connector 1 is attached to a board 13 or an enclosure (not shown), the threaded portion 82 of the anchor fittings 8 is positioned parallel to, for example, the rear surface of the board 13, and, while having a portion of a screw (not shown) engaged with a semi-circular notch 82*a* provided in the threaded portion 82, said screw is screwed into the board 13.

The connector 1 can be connected to a counterpart connector, in particular, to the counterpart terminals 11 thereof (see FIG. 1, FIG. 6). At the time of such connection, at least a portion of the counterpart terminals 11 can be inserted into the insertion space 20 of the housing (2, 3) from locations spaced apart in the height direction "α" of the housing (2, 3) from one side (m) toward the other side (n), or alternatively, from the other side (n) toward the one side (m), and can be electrically connected to at least a portion of the terminals 6 positioned within the insertion space 20. As described hereinafter, the counterpart terminals 11 can be inserted from the other side (n) toward the one side (m).

Figure 8:
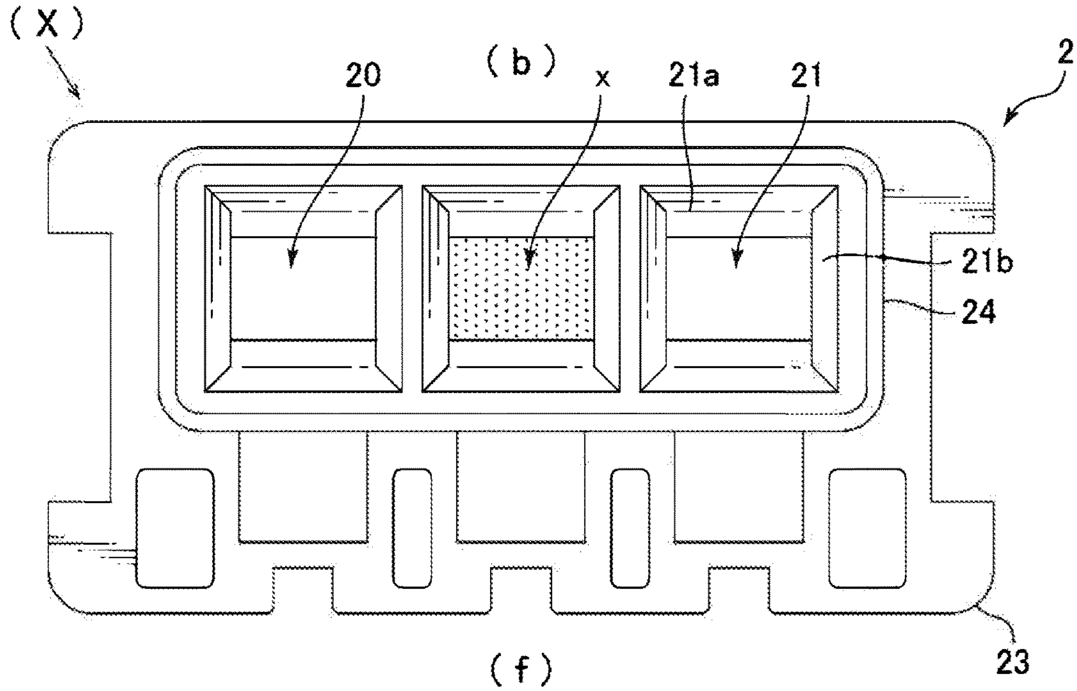
Figure 9:
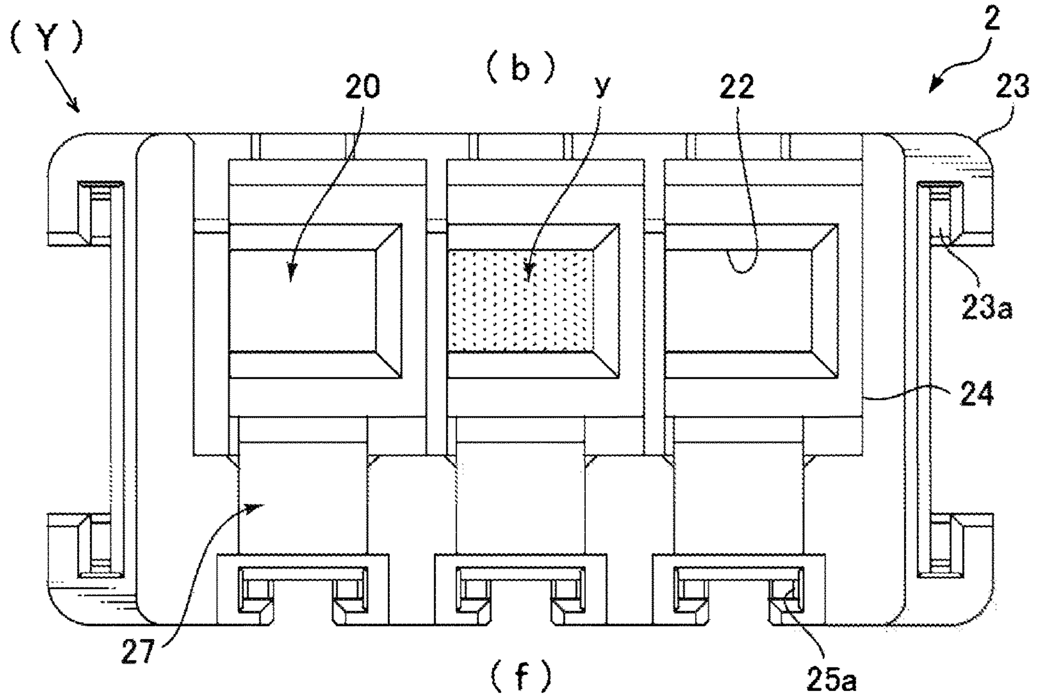
Figure 11:
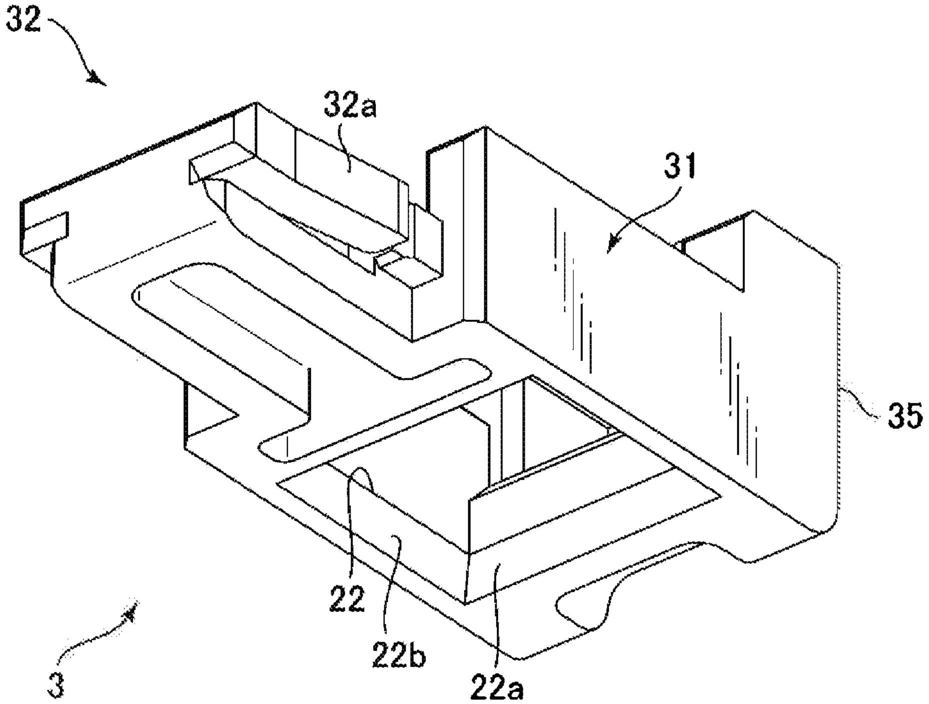
Figure 12:
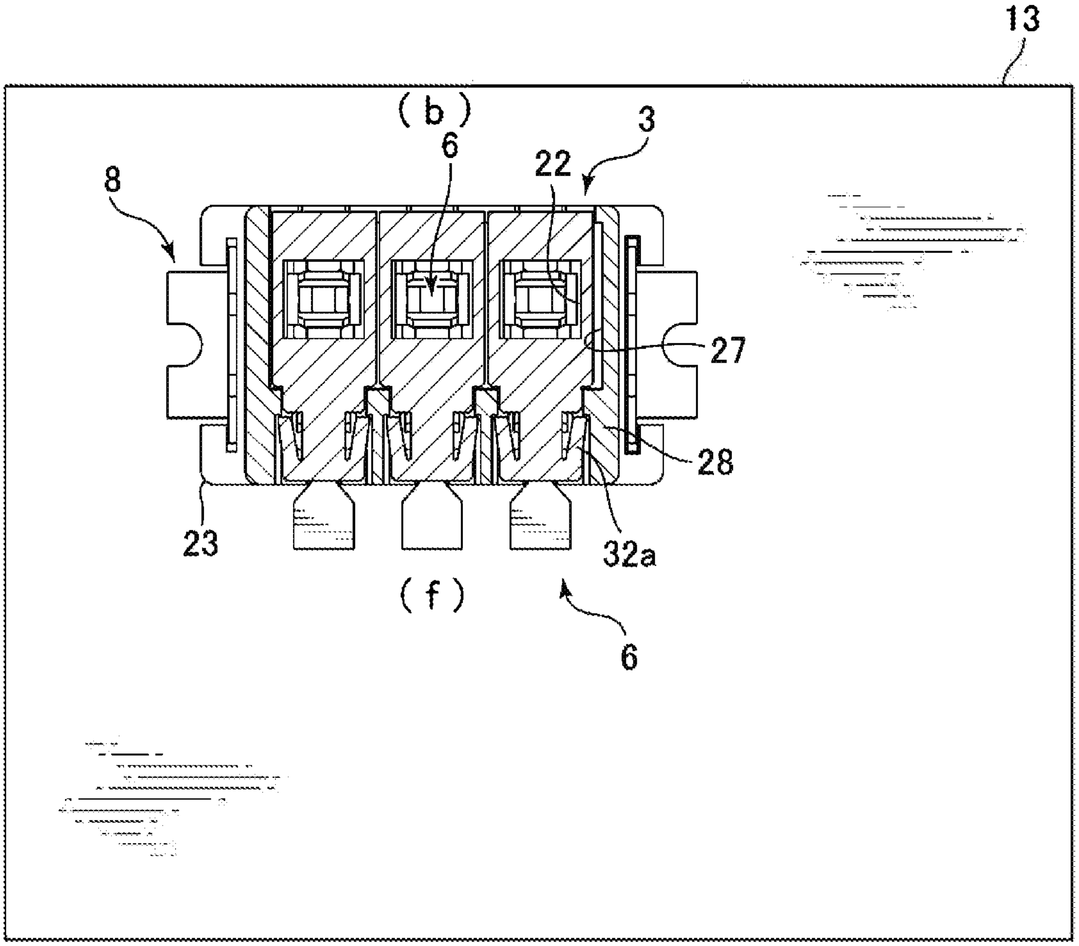

The housing includes a main body of the housing 2 and lid-shaped members 3. A perspective view of the main body of the housing 2 is illustrated in FIG. 7, a plan view thereof is illustrated in FIG. 8, and, furthermore, a bottom view thereof is illustrated in FIG. 9, respectively. In addition, a top perspective view of a lid-shaped member 3 is illustrated in FIG. 10, a bottom perspective view thereof is illustrated in FIG. 11, and a VI-VI cross-sectional view of FIG. 6, which shows the relationship between the lid-shaped members 3 and the main body of the housing 2, is illustrated in FIG. 12, respectively. The main body of the housing 2 and the lid-shaped member 3 are both made of plastics.

To attach the anchor fittings 8 to the main body of the housing 2, a pair of grooves 23*a* respectively indented in the width direction "γ" are provided along the height direction "α" and depth direction "β" on the respective opposite sides of the main body of the housing 2 in the width direction "γ". The anchor fittings 8 can be press-fittingly secured to the main body of the housing 2 using press-fit projections 80*a* by press-fitting the anchor fittings 8 into each groove 23*a* from the other side (n) toward the one side (m) in the height direction "α".

The insertion space 20, into which the counterpart terminals 11 are inserted, is formed in the interior of the housing (2, 3) by the main body of the housing 2 and the lid-shaped members 3. Within the insertion space 20, a portion of the terminals 6 is positioned in a state that enables contact with inserted counterpart terminals 11 as well as in a state that enables movement in the interior of the insertion space 20 through contact with the counterpart terminals 11.

Insertion apertures 21 (first insertion apertures) and insertion apertures 22 (second insertion apertures) intended for inserting the counterpart terminals 11, which are placed in communication with the insertion space 20, are respectively provided on one side (m) and on the other side (n) in the height direction "α" of the housing (2, 3).

Insertion apertures 21 occupy a predetermined area (x) within a first "β-γ" plane (plane X) formed by the depth direction "β" and width direction "γ" of the housing (2, 3) (see FIG. 3) and, on the other hand, insertion apertures 22 occupy a predetermined area (y) within a second "β-γ" plane (plane Y) formed by the same directions (see FIG. 5).

Insertion apertures 21 are provided in the main body of the housing 2 and, furthermore, in the neck portion 24 of the main body of the housing 2 protruding on one side (m) in the height direction "α". To facilitate leading the counterpart terminals 11 into the insertion space 20, insertion apertures 21 are provided with inclined faces 21*a*, 21*b*. Inclined faces 21*a* are pairs of inclined faces respectively extending in the width direction "γ" at locations opposed in the depth direction "β" of the first "β-γ" plane (plane X). On the other hand, inclined faces 21*b* are pairs of inclined faces respectively extending in the depth direction "β" at locations opposed in the width direction "γ" of the first "β-γ" plane (plane X). Here, inclined faces 21*a* extend deeper into the insertion apertures 21 in the height direction "α" than inclined faces 21*b*. Therefore, in the vicinity of their boundaries, inclined faces 21*a* and inclined faces 21*b* form stepped portions in the height direction "α".

On the other hand, insertion apertures 22 are provided in the lid-shaped members 3 and not in the main body of the housing 2. To facilitate leading the counterpart terminals 11 into the insertion space 20, insertion apertures 22 are also provided with inclined faces 22*a*, 22*b*. Inclined faces 22*a* are pairs of inclined faces respectively extending in the width direction "γ" at locations opposed in the depth direction "β" of the second "β-γ" plane (plane Y). On the other hand, inclined faces 22*b* are pairs of inclined faces respectively extending in the depth direction "β" at locations opposed in the width direction "γ" of the second "β-γ" plane (plane Y). Here, due to the fact that both inclined faces 22*a* and inclined faces 22*b* extend to the same degree into the interior of insertion apertures 21 in the height direction "α", these inclined faces 22*a*, 22*b* form rectangular circumferential inclined faces in the second "β-γ" plane (plane Y).

The counterpart terminals 11 are inserted from locations spaced apart in the height direction "α" into the insertion space 20 within the housing (2, 3) through the insertion apertures 21 from one side (m) toward the other side (n) and, in addition, inserted from locations spaced apart in the height direction "α" into the insertion space 20 within the housing (2, 3) through the insertion apertures 22 from the other side (n) toward the one side (m).

The insertion apertures 21, 22 serve as through-holes that allow the counterpart terminals 11 to pass therethrough. For example, if the counterpart terminals 11 are inserted through the insertion apertures 21 from one side (m) toward the other side (n) and if the length of the counterpart terminals 11 is longer than the dimensions of the housing (2, 3), the counterpart terminals 11 can extend through the insertion space 20 and protrude from the other insertion apertures 22. Therefore, the connectors can be connected without regard to the length of the counterpart terminals 11.

To attach the terminals 6, a single groove 25*a* is provided for each terminal 6 in the height direction "α" on one side (f) of the main body of the housing 2 in the depth direction "β". Since there are three terminals 6 provided in the present embodiment, a total of three grooves 25*a* are provided in the width direction "γ". The terminals 6 are inserted into the insertion space 20 from the other side (n) toward the one side (m) in the height direction "α" through opening portions 27 provided in the second "β-γ" plane (plane Y) and in the "α-β" plane (plane Z) formed by the height direction "α" and the width direction "γ" of the housing (2, 3). At such time, a portion of the terminals 6 (621) is press-fitted into each groove 25*a* in the height direction "α", such that the terminals 6, with one end side 61*a* thereof, are secured to and are resiliently supported by the main body of the housing 2 in a cantilever configuration.

After attaching the terminals to the main body of the housing 2, the lid-shaped members 3 are attached to opening portions 27. Attaching the lid-shaped members 3 to the main body of the housing 2 can substantially seal the insertion space 20 and prevent dust and other foreign matter from entering the insertion space 20. In addition, providing the lid-shaped members 3 can prevent the terminals 6 from decoupling and falling off the main body of the housing 2. The lid-shaped members 3 are attached by sliding in the depth direction "β" into the opening portions 27 provided in the main body of the housing 2 from the other side (b) toward the one side (f) in the depth direction "β".

The lid-shaped members 3 have a generally box-like main body 31 with an open top portion, an engagement portion 32 provided on the distal end side of the main body 31, and, furthermore, a sealing portion 35 provided in a raised configuration on the rear end side of the main body 31.

The main body 31 is provided with opening portions passing therethrough in the height direction "α" to thereby define insertion apertures 22. The engagement portion 32 is provided with resilient engagement pieces 32*a* that can undergo resilient deformation in the width direction "γ", and, when attached to the main body of the housing 2, the lid-shaped members 3 can engage projections 28 provided in the opening portions 27. In the "α-β" plane (plane Z), the sealing portion 35 is shaped to be complementary to the opening sections of the opening portions 27 in the perimeter wall of the main body of the housing 2 on the side (b) opposite to the one side (f) in the depth direction "β" of the main body of the housing 2, and when the lid-shaped members 3 are attached to the main body of the housing 2, the perimeter wall of the housing can be substantially sealed.

Figure 14:
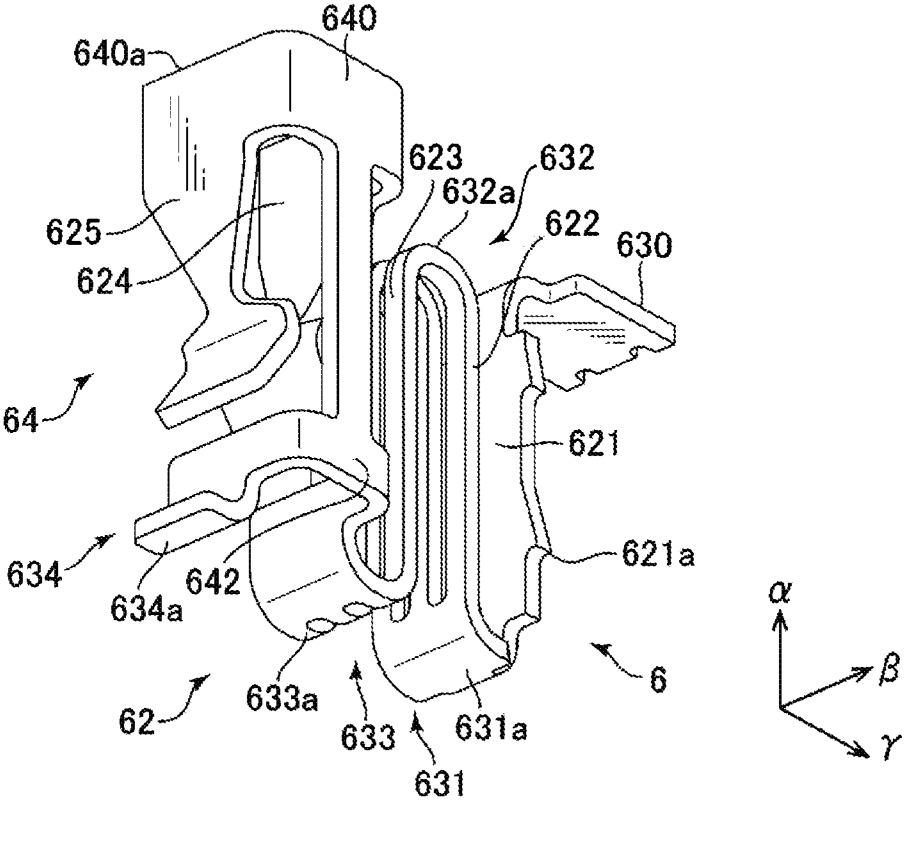
Figure 15:
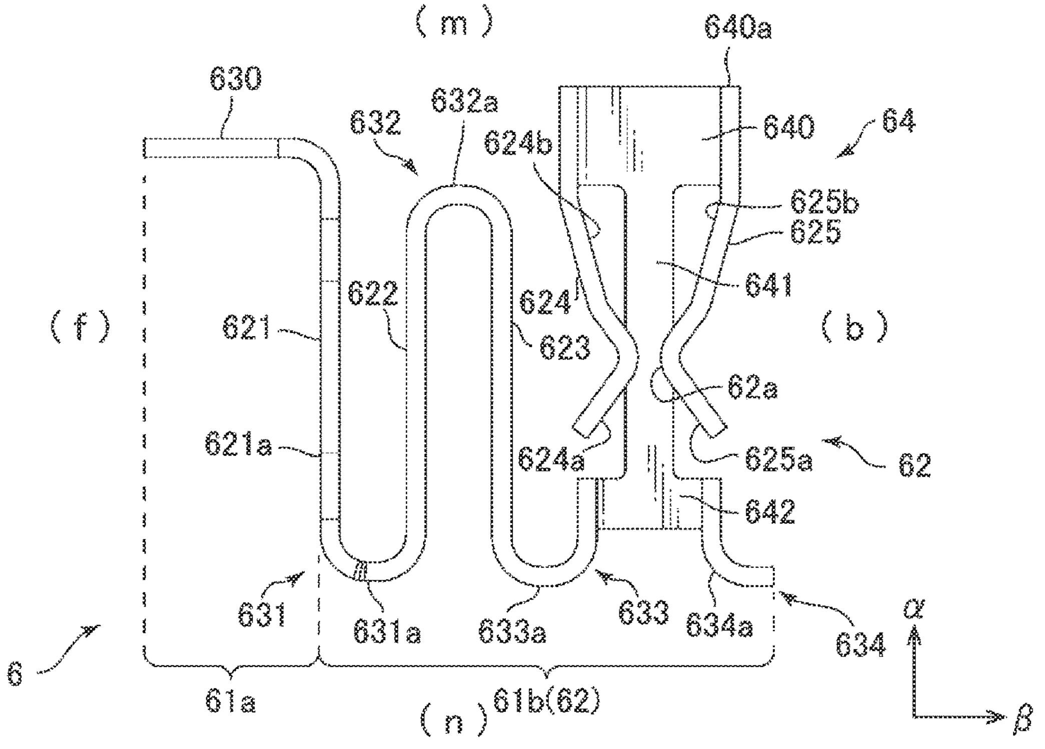
Figure 16:
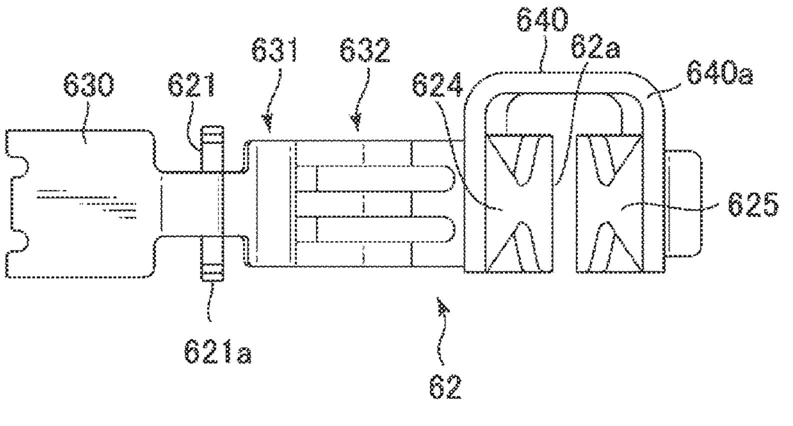

A top perspective view of a terminal 6 is illustrated in FIG. 13, a bottom perspective view thereof is illustrated in FIG. 14, a lateral view thereof is illustrated in FIG. 15, and, furthermore, a plan view thereof is illustrated in FIG. 16, respectively. The terminals 6 are formed in a generally plate-like configuration by blanking from a metal sheet and bending.

Each terminal 6 includes a base portion 621 and an anchoring portion 630 on one end side 61*a* and comprises a resilient member 62 forming a free end on the other end side 61*b* opposite said one end side 61*a*. When the terminals 6 are attached to the main body of the housing 2, one end side 61*a* is positioned on one side (f) in the depth direction "β" and the other end side 61*b* is positioned on the side (b) opposite to the one side (f) in the depth direction "β".

The base portion 621 has press-fit projections 621*a* that protrude outwardly on the opposite sides in the width direction "γ". As a result of press-fitting the base portions 621 of each terminal 6 into the respective grooves 25*a* provided in the main body of the housing 2 (see FIG. 9, etc.) from locations spaced apart in the height direction "α", the terminals 6 are press-fittingly secured to the main body of the housing 2 using the press-fit projections 621*a*.

The anchoring portions 630, which are sections of a generally L-shaped configuration when viewed from the side in conjunction with the base portions 621, are positioned in parallel to, for example, the rear surface of a board 13 after the base portions 621 have been press-fitted into the grooves 25*a*. The anchoring portions 630 are secured to a board 13, i.e., a fixed member, using solder or the like. Therefore, in the same manner as the anchor fittings 8, the anchoring portions 630 can be used to attach the connector 1 to a board 13 or the like.

The terminals 6, which have only one end side 61*a* secured to the main body of the housing 2, are provided in a cantilever configuration within the insertion space 20. The other end side 61*b*, on which the resilient member 62 is formed, is not secured. Thus, the resilient member 62 is installed with play within the insertion space 20 of the main body of the housing 2, and the other end side 61*b* of the terminals 6 can move within the insertion space 20 and, in addition, relative to the housing (2, 3), in particular, the insertion apertures 21 thereof. Although the dimensions of the terminals 6 need to permit installation with play within the insertion space 20, the dimensions occupied by the terminals 6 in the first "β-γ" plane (plane X) may, of course, exceed the predetermined area (x) occupied by insertion apertures 21 in the above-mentioned plane (plane X) and, similarly, the dimensions occupied by the terminals 6 in the second "β-γ" plane (plane Y) may, of course, exceed the predetermined area (y) occupied by insertion apertures 21 in the above-mentioned plane (plane Y). As a result, the resilient member 62 is not affected by vibration and the like generated by other members, and resonance frequencies can also be properly minimized. In addition, due to the fact that in contradistinction to conventional connectors described in the prior art, there is no movable housing secured to the terminals 6, the load applied to the terminals 6 can be alleviated and the durability of the terminals can be improved.

The resilient member 62 includes a plurality of vertical sections 622, 623 extending between one side (m) and the other side (n) in the height direction "α", a plurality of curved sections 631, 632, 633, and 634 having apex portions 631*a*, 632*a*, 633*a*, and 634*a* respectively on one side (m) or on the other side (n), and furthermore, a contact member 64 forming a free end at the end on the other end side 61*b*. The curved sections 633, 634 also form part of the contact member 64. The plurality of vertical sections 622, 623 and the plurality of curved sections 631, 632, 633, and 634 are coupled in an alternating manner and, furthermore, on the whole, these sections and the contact member 64 are coupled to one another so as to extend in the depth direction "β".

Although the vertical sections 622, 623 are formed as generally linear members extending between one side (m) and the other side (n) in the height direction "α", they may be inclined to a certain extent.

The curved sections 631, 632, 633, and 634, along with the vertical sections 622, 623, couple the contact member 64 to the one end side 61*a* of the terminals 6 and jointly impart resilience to the contact member 64. The curved sections 631, 633 are formed as generally U-shaped portions, with their apex portions 631*a*, 633*a* directed toward the other side (n) in the height direction "α", that is, toward the insertion apertures 22. Further, in the same manner as the curved sections 631, 633, the curved section 632 is also formed as a generally U-shaped portion, with its apex portion 632*a* directed toward the one side (m) in the height direction "α", that is, toward the insertion apertures 21. On the other hand, the curved section 634 is formed as a generally semi-U-shaped portion, with its apex portion 634*a* directed toward the other side (n) in the height direction "α", that is, toward the insertion apertures 22.

As best shown in FIG. 4 and FIG. 5, when the terminals 6 are installed in the main body of the housing 2, at least a portion of the curved sections 633, 634, for example, sections 633*b*, 634*b*, which are somewhat closer to the insertion apertures 22 than the apex portions 633*a*, 634*a* of the curved sections 633, 634, is positioned within the bounds of the predetermined area (y) occupied by insertion apertures 22 in the second "β-γ" plane (plane Y). Thus, using the portions 633*b*, 634*b* of the curved sections 633, 634 as lead-in portions allows counterpart terminals 11 inserted with misalignment relative to the insertion apertures 22 to be reliably led into the insertion space 20. It should be noted that "misalignment", as used in the present embodiment as well as the hereinafter-described embodiments and reference examples, includes not only "misalignment" that may occur when the counterpart terminals 11 are inserted in a rectilinear manner almost completely in the height direction "α", but also "misalignment" that may occur, for example, when the counterpart terminals 11 are inserted in a direction other than completely in the height direction "α", that is, in a diagonal direction. In addition, this also includes "misalignment" due to forcible insertion when the counterpart terminals 11 are significantly offset from the insertion apertures 22 regardless of being inserted rectilinearly or inserted in a diagonal direction. In other words, as used herein, "misalignment" includes all instances of "misalignment" that may occur when the counterpart terminals 11 are inserted into the insertion apertures 22 from locations spaced apart in the height direction "α". In all instances of "misalignment" as used in the present embodiment as well as in the hereinafter-described embodiments and reference examples, the counterpart terminals 11 can be reliably led into the insertion space 20.

The contact member 64 forms a free end at the end of the resilient member 62. In addition to a pair of contact pieces 624, 625, which are spaced apart from each other in the depth direction "β", a plate-shaped supporting portion 640, which extends between one side (m) and the other side (n) in the depth direction "β" and couples the pair of contact pieces 624, 625 at the end portion of one side (m) in the height direction "α", and, furthermore, curved sections 633, 634 forming part of the contact member 64, the contact member 64 includes a plate-shaped supporting portion 642, which couples these curved sections 633, 634, and, furthermore, a plate portion 641, which couples the plate-shaped supporting portion 642 and the plate-shaped supporting portion 640 and which extends between one side (m) and the other side (n) in the height direction "α". The contact points 62*a* with the counterpart terminals 11 are formed in a raised shape by bending this pair of contact pieces 624, 625 in a wedge-like shape converging toward each other in the depth direction "β" at locations proximate the other side (n) in the height direction "α". As a result of bending in a wedge-like shape, the pair of contact pieces 624, 625 form slopes converging toward each other as one moves deeper into the insertion space 20 in the height direction "α", with these inclined sections 624*a*, 625*a* drawing in the counterpart terminals 11 in cooperation with the lead-in portions 633*b*, 634*b* of the curved sections 633, 634 and reliably guiding the counterpart terminals 11 toward the contact points 62*a*. The counterpart terminals 11 inserted into the insertion space 20 through the insertion apertures 21, 22 are ultimately sandwiched between the contact points 62*a* formed on this pair of contact pieces 624, 625 and are connected to the terminals 6 in a state of resilient contact.

As can be seen in FIGS. 3, 4, 5, 8, 9, etc., in the present configuration, at least a portion of the resilient member 62 other than the contact points 62*a* of the terminals 6, for example, at least the portions 624*a*, 625*a* or 624*b*, 625*b* of the pair of contact pieces 624, 625, along with the contact points 62*a*, are positioned within the bounds of the predetermined area (x) in the first "β-γ" plane (plane X) defined by insertion apertures 21 and, in addition, are positioned within the bounds of the predetermined area (y) in the second "β-γ" plane (plane Y) defined by insertion apertures 22. In other words, the insertion apertures 21, 22 are substantially open for the contact points 62*a*. In this case, before the counterpart terminals 11, inserted with misalignment relative to the insertion apertures 21, 22, make contact with the contact points 62*a*, collision with the counterpart terminals 11 takes place in sections other than the contact points 62*a*, for example, sections 624*a*, 625*a* or 624*b*, 625*b*, and, as a result of such collision, the contact member 64, which forms a free end, is caused to move within the predetermined area (x) or (y) under the action of the resilient member 62 and correct the misalignment, thereby allowing the counterpart terminals 11 to be brought into solid contact with the contact points 62*a*. Thus, the contact pieces 624, 625 not only serve to lead the counterpart terminals 11 inserted through the insertion apertures 21, 22 toward the contact points 62*a*, but also have the capability to correct misalignment through collision with the counterpart terminals 11 inserted with misalignment relative to the insertion apertures 21, 22. Therefore, the present configuration accommodates misalignment at the time of insertion of the counterpart terminals 11 without providing a movable housing. It should be noted that since misalignment due to forcible insertion that occurs when the counterpart terminals 11 are significantly offset from the insertion apertures 22 is also accommodated, a portion of the terminals 6 may be provided at a location offset from the insertion apertures 22. In other words, the present configuration makes it sufficient to position sections other than the contact points 62*a* with the counterpart terminals 11 within the bounds of the insertion apertures 22, and also includes aspects wherein a portion of the terminals 6 is positioned outside of the bounds of the insertion apertures 22.

Figure 17:
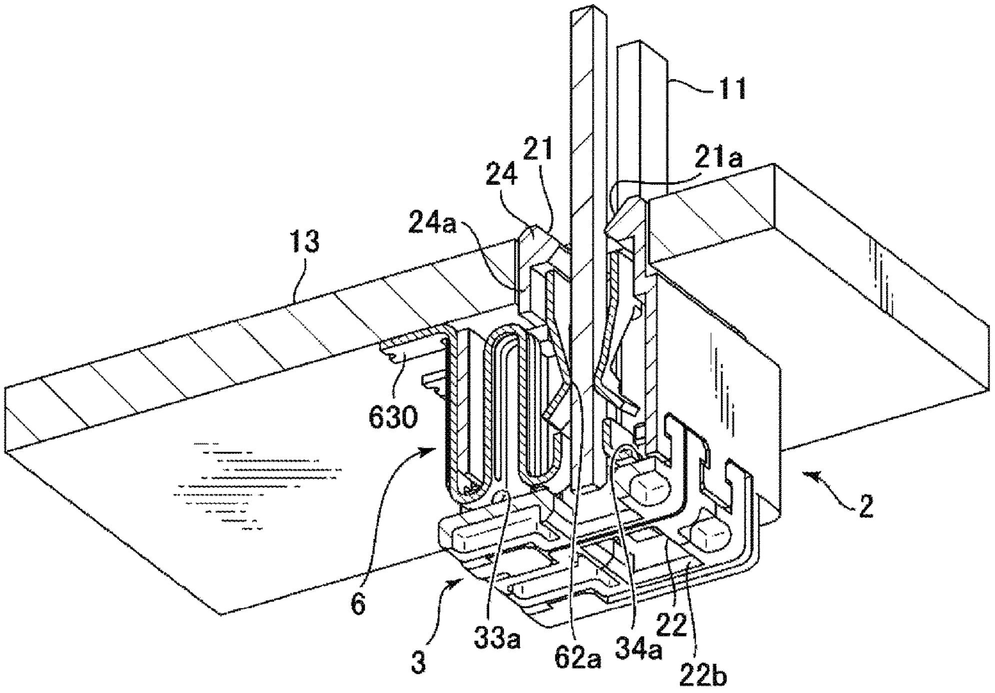

An exemplary mode of use of the connector 1 is illustrated in FIGS. 17 to 20. FIG. 17 is a perspective cross-sectional view illustrating a state in which the counterpart terminals 11 have been inserted into the insertion space 20 through the insertion apertures 21 from one side (m) toward the other side (n) in the height direction "α" and are sandwiched by the contact points 62*a* respectively provided in the pair of contact pieces 624, 625, in other words, a state of full connection of the terminals 6 to the counterpart terminals 11.

Figure 18:
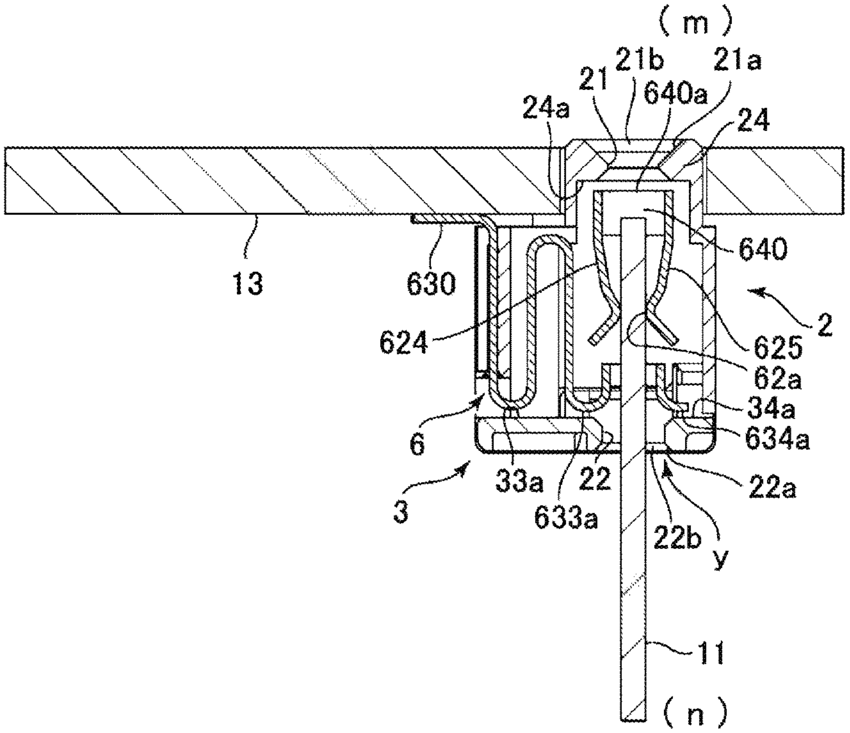

On the other hand, FIG. 18 is a lateral cross-sectional view illustrating a state in which the counterpart terminals 11 have been inserted into the insertion space 20 through the insertion apertures 22 from the other side (n) toward the one side (m) in the height direction "α" and the terminals 6 have been fully connected to the counterpart terminals 11.

As can be seen from these drawings, in accordance with the present configuration, the counterpart terminals 11 can be inserted not only from one side (m) toward the other side (n) in the height direction "α", but also from the other side (n) toward the one side (m) in the height direction "α".

Figure 19:
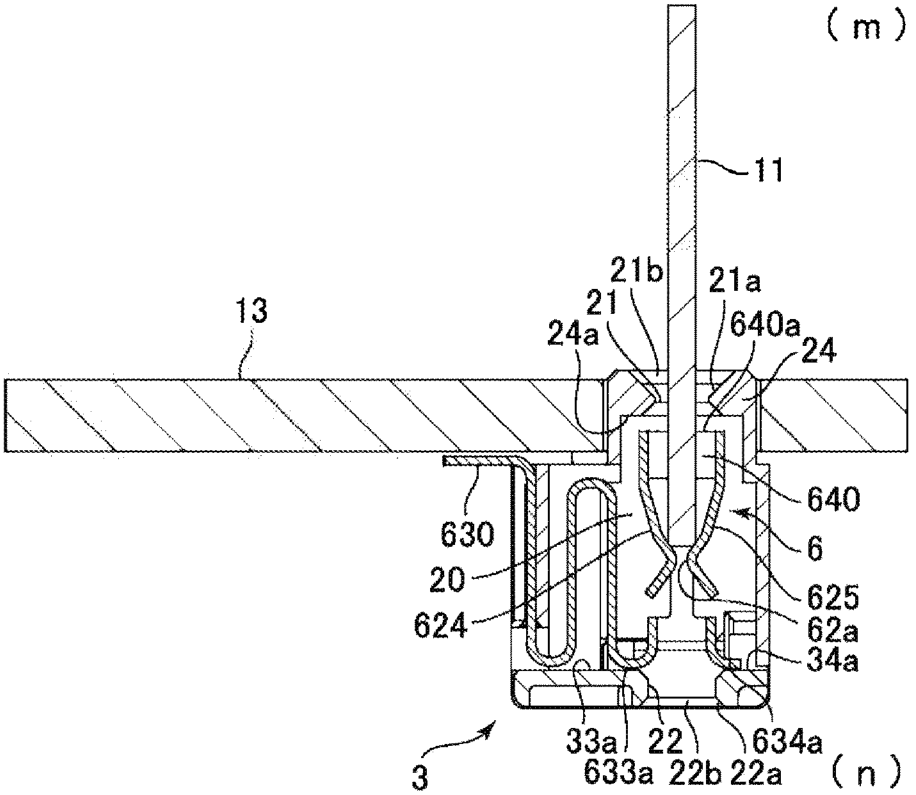
Figure 20:
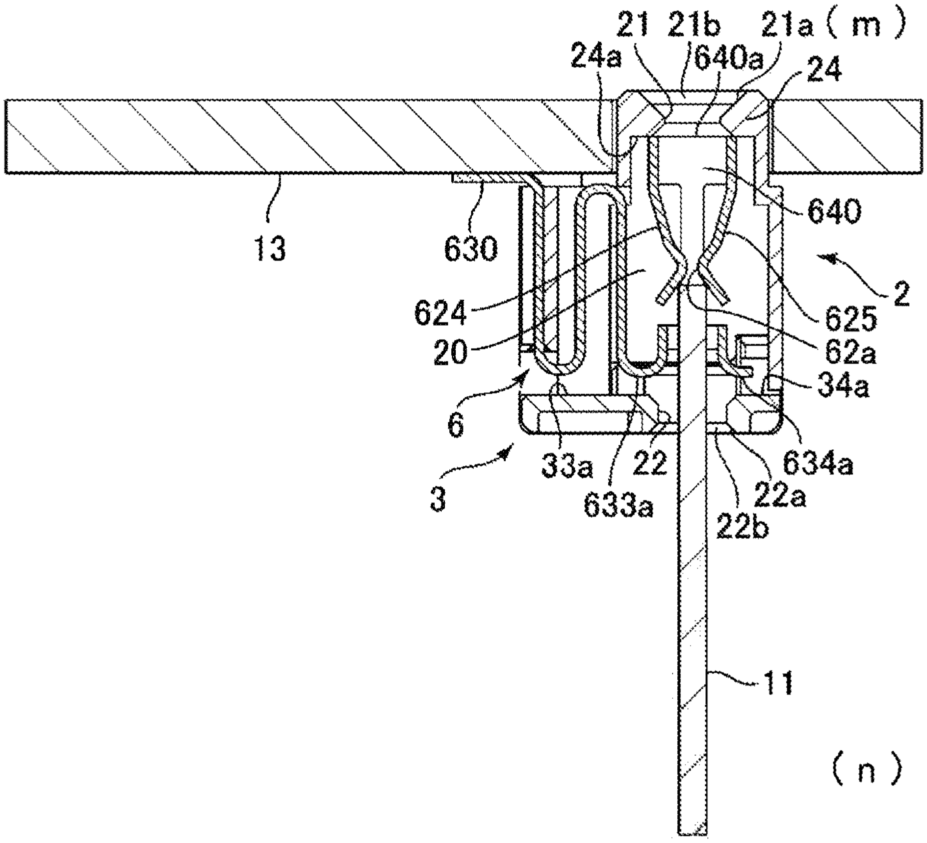

FIG. 19 and FIG. 20 are lateral cross-sectional views illustrating a state before the terminals 6 are fully connected to the counterpart terminals 11 and, furthermore, views used to explain a configuration intended for preventing excessive displacement of the resilient member 62, wherein FIG. 19 illustrates a state in which the counterpart terminals 11 have been inserted through the insertion apertures 21 from one side (m) toward the other side (n) in the height direction "α" and have collided with the pair of contact pieces 624, 625, and FIG. 20 illustrates a state in which the counterpart terminals 11 have been inserted through the insertion apertures 22 from the other side (n) toward the one side (m) in the height direction "α" and have collided with the pair of contact pieces 624, 625, respectively.

In accordance with the present configuration, the resilient action of the resilient member 62 is used to cause at least a portion of the resilient member 62 to collide with any of the inner walls of the insertion space 20 and thus make it possible to prevent excessive displacement of the resilient member 62.

For example, as shown in FIG. 19, in the case in which the counterpart terminals 11 are inserted through the insertion apertures 21 and collide with the contact pieces 624, 625, due to the action of the resilient member 62, the contact member 64, along with the counterpart terminals 11, is subject to pressure applied from one side (m) toward the other side (n) in the height direction "α", as a result of which at least a portion of the curved sections 633, 634, for example, the apex portions 633*a*, 634*a*, can collide with the inner walls 33*a*, 34*a* of the lid-shaped members 3 that constitute the housing. This prevents excessive displacement toward the other side (n).

In addition, as shown in FIG. 20, in the case in which the counterpart terminals 11 are inserted through the insertion apertures 22 and collide with the contact pieces 624, 625, due to the action of the resilient member 62, the contact member 64, along with the counterpart terminals 11, is subject to pressure applied from the other side (n) toward the one side (m) in the height direction "α", as a result of which the pair of contact pieces 624, 625 and the edge portion 640*a* on one side (m) in the height direction "α" of the plate-shaped supporting portion 640 can collide with the inner walls 24*a* of the insertion space 20. This prevents excessive displacement toward the one side (m).

Second Embodiment

A connector according to a second embodiment of the present invention will be described next. The same reference numerals are used, with the letters "A", "B" assigned thereto, for members corresponding to the connector 1 of the first embodiment. Matters not specifically recited herein may be construed in a manner similar to the matters relating to connector 1.

Figure 22:
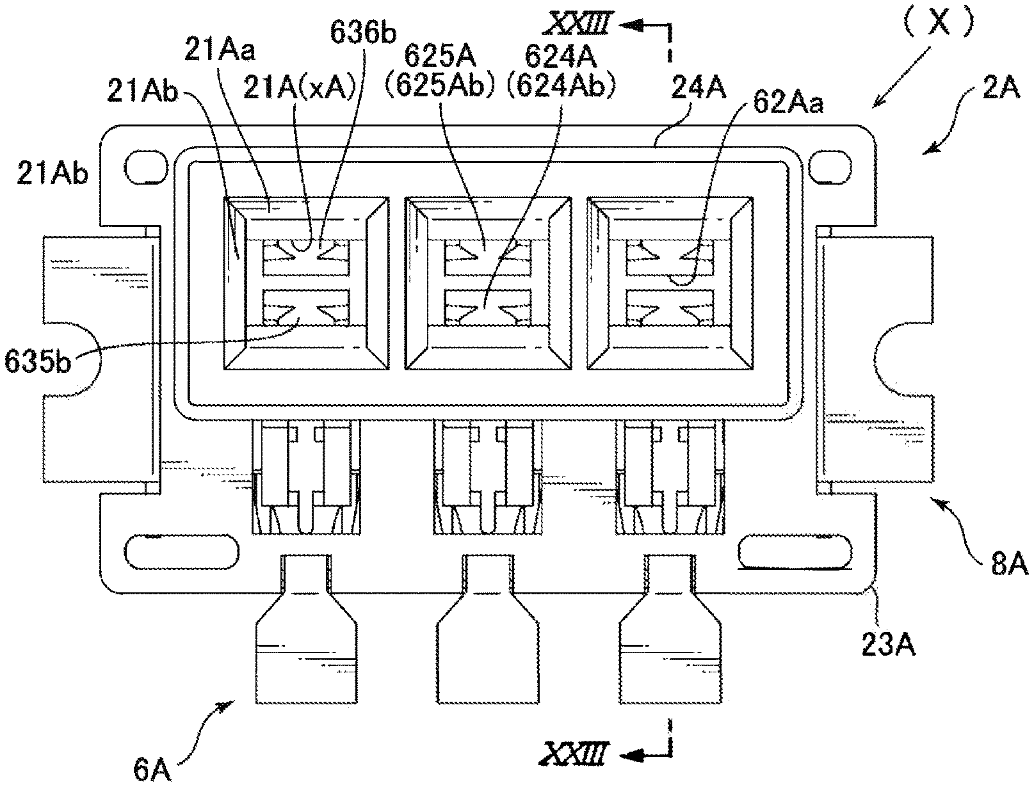
Figure 23:
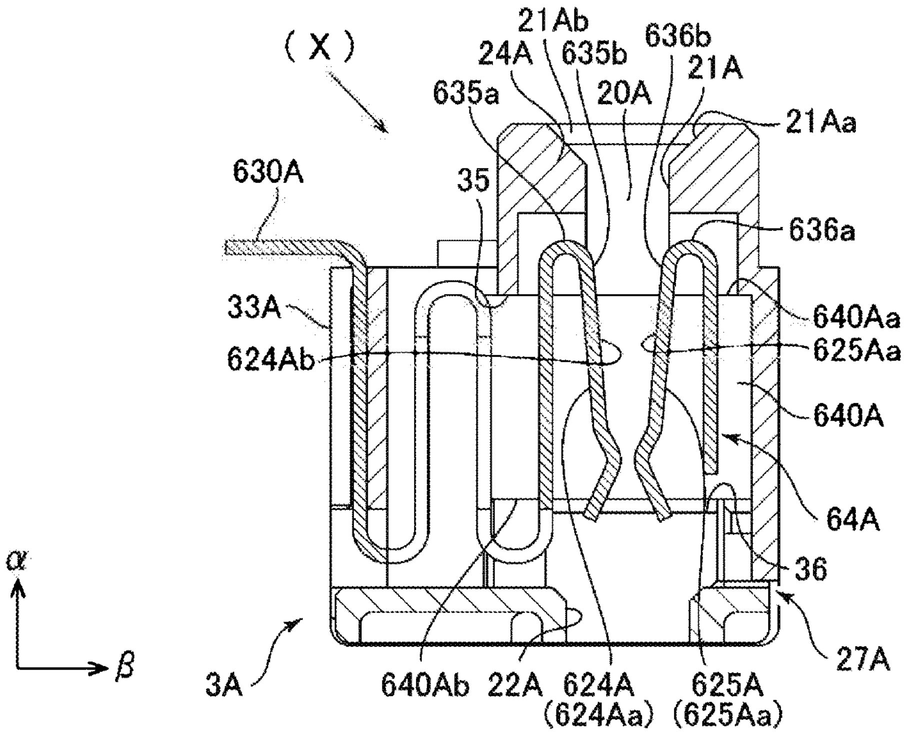
Figure 24:
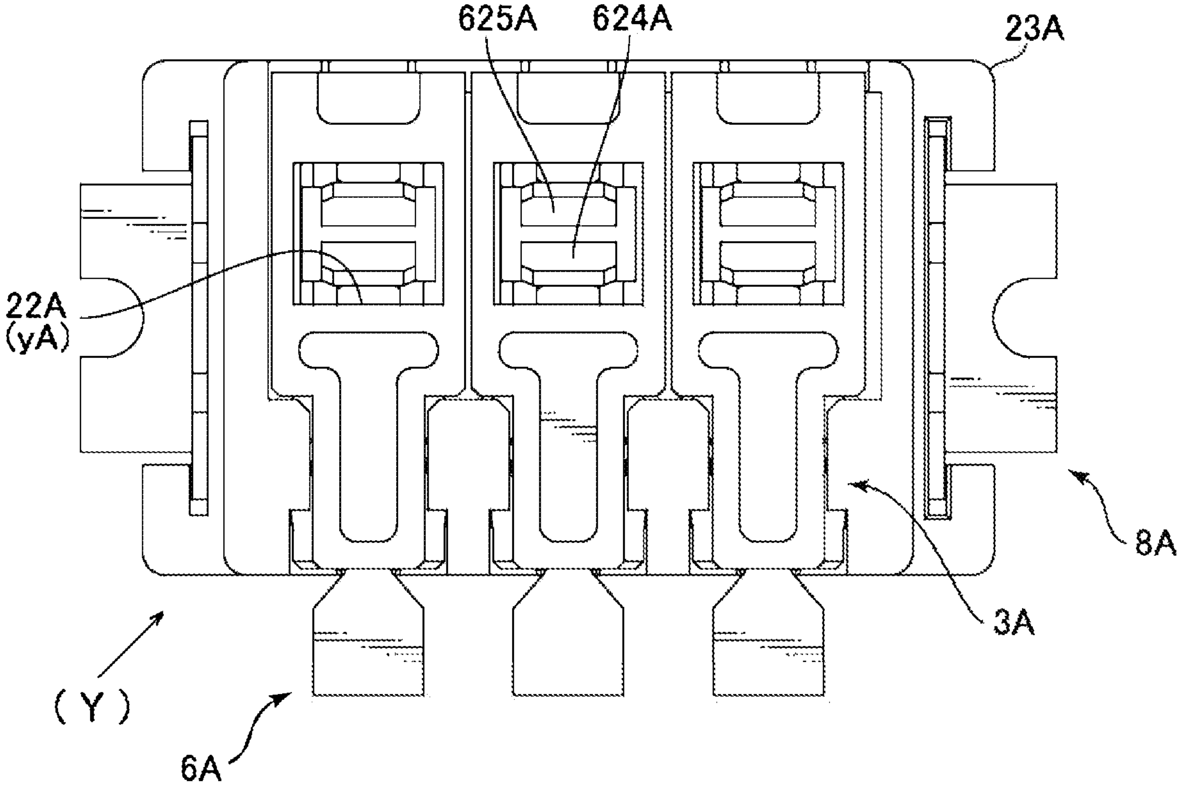

A top perspective view of the connector 1A according to the second embodiment of the present invention is illustrated in FIG. 21, a plan view of the connector 1A of FIG. 1 is illustrated in FIG. 22, a cross-sectional view of FIG. 22 taken along line XXIII-XXIII is illustrated in FIG. 23, and a bottom view thereof is illustrated in FIG. 24. The connector 1A according to the second embodiment differs from the connector 1 according to the first embodiment in terms of the shape of the terminals 6A as well as the direction of insertion of the counterpart terminals 11, in other words, in that it is configured with a view to insert the counterpart terminals 11 into the insertion space 20A of the housing (2A, 3A) only from one side (m) toward the other side (n). With regard to other features, the connector can be considered to have a configuration that is the same or corresponds to that of the connector 1 of the first embodiment. Although it should be noted that the counterpart terminals 11 can be inserted from the other side (n) toward the one side (m), this is not the intended mode of insertion.

In the same manner as the connector 1 of the first embodiment, the connector A1 also includes a housing (2A, 3A) along with terminals 6A and anchor fittings 8A secured to the housing (2A, 3A).

Figure 26:
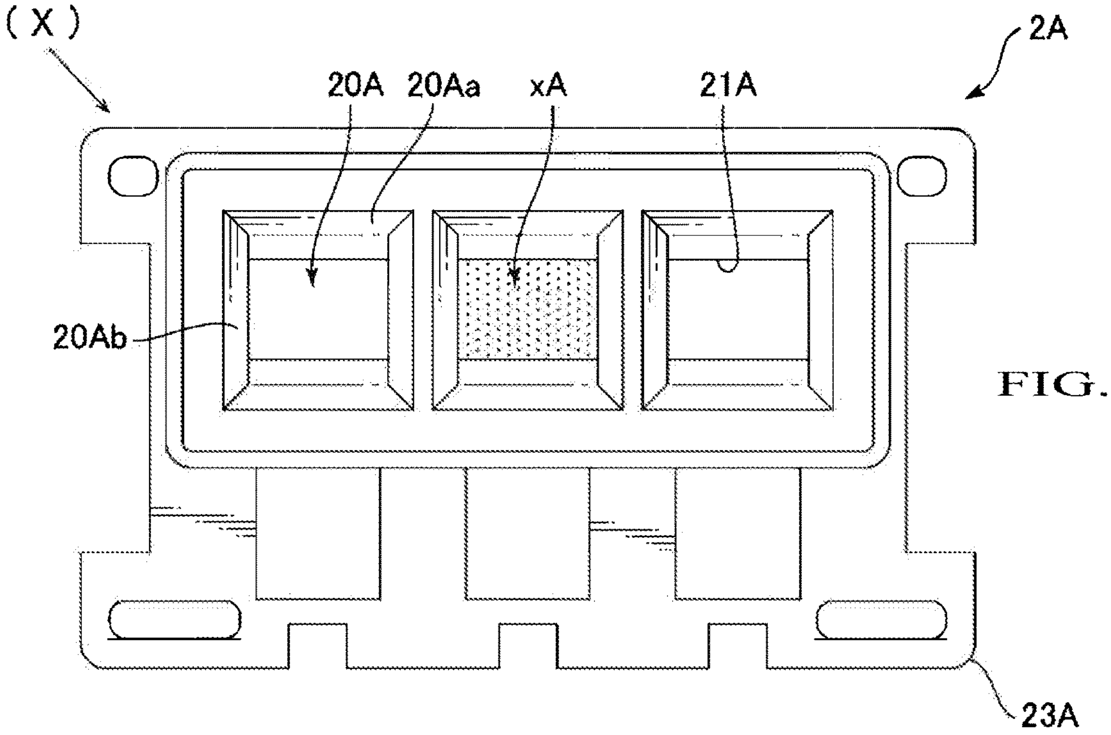
Figure 27:
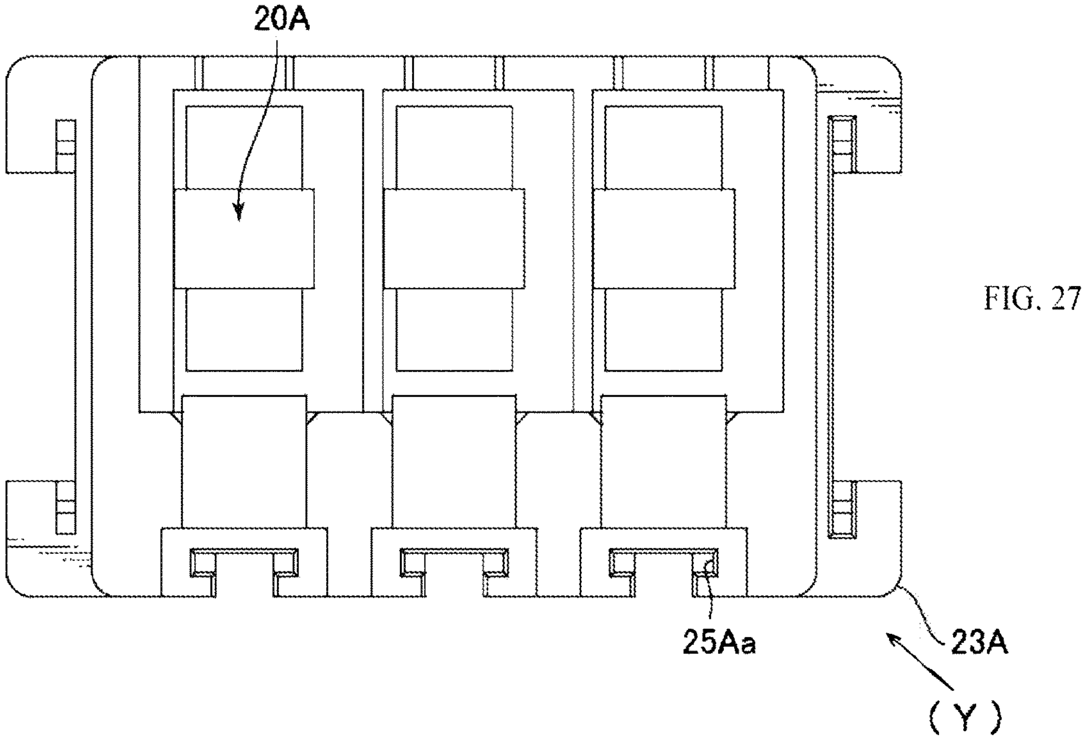
Figure 29:
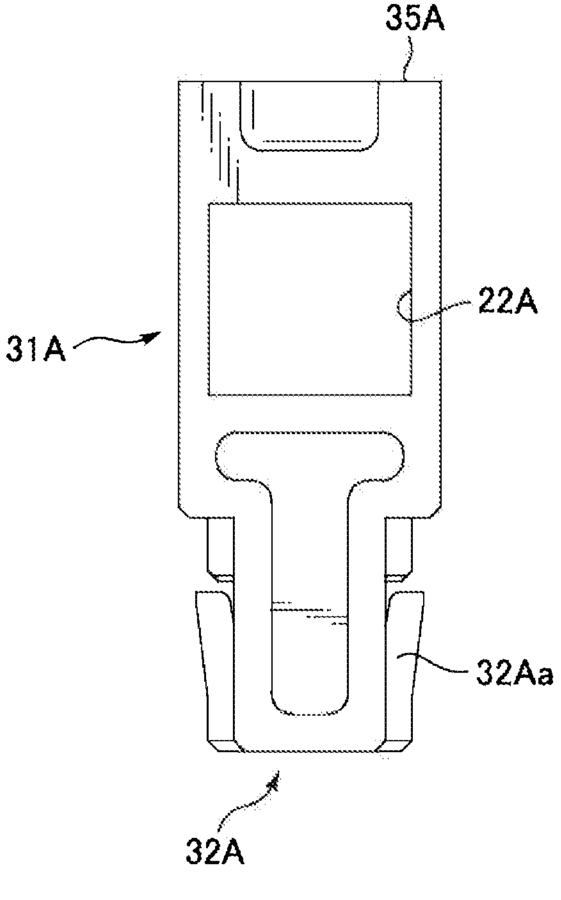

A perspective view of the main body of the housing 2A is illustrated in FIG. 25, a plan view thereof is illustrated in FIG. 26, and furthermore, a bottom view thereof is illustrated in FIG. 27. In addition, a top perspective view of a lid-shaped member 3A is illustrated in FIG. 28 and a bottom perspective view thereof is illustrated in FIG. 29, respectively.

An insertion space 20A is formed in the interior of the housing (2A, 3A) by the main body of the housing 2A and the lid-shaped members 3A. Within the insertion space 20A, a portion of the terminals 6A is positioned in a state that enables contact with the inserted counterpart terminals 11 while also enabling movement in the interior of the insertion space 20A through contact with the counterpart terminals 11. Although both sides, i.e., the one side "m" and the other side (n) in the height direction "α", are respectively open in the same manner as in the first embodiment, only the one side "m" serves to provide insertion apertures 21A for inserting the counterpart terminals 11 while the other side "n" serves mainly to provide through-holes 22A that allow the counterpart terminals 11 to pass therethrough. The counterpart terminals 11 are inserted into the insertion space 20A of the housing (2A, 3A) from locations spaced apart in the height direction "α" from one side (m) toward the other side (n).

The insertion apertures 21A occupy a predetermined area (xA) in the first "β-γ" plane (plane X) formed by the depth direction "β" and width direction "γ" of the housing (2A, 3A).

The inclined faces 21Aa, 21Ab are provided in the insertion apertures 21A in order to facilitate leading the counterpart terminals 11 into the insertion space 20A.

Each terminal 6A is inserted into the insertion space 20A through opening portions 27A provided in the second "β-γ" plane (plane Y) and in the "α-β" plane (plane Z) from the other side (n) toward the one side (m) in the height direction "α" and is secured at a predetermined location of the main body of the housing 2A.

After securing the terminals 6A to the main body of the housing 2A, the lid-shaped members 3A are attached to the opening portions 27A provided to attach the terminals 6A. The lid-shaped members 3A have a generally box-like main body 31A with an open top portion, an engagement portion 32A provided on the distal end side of the main body 31A, and, furthermore, a sealing portion 35A provided on the rear end side of the main body 31A. Although the shapes are slightly different from the lid-shaped members 3 of the first embodiment, there are no substantial differences in terms of functionality.

Figure 31:
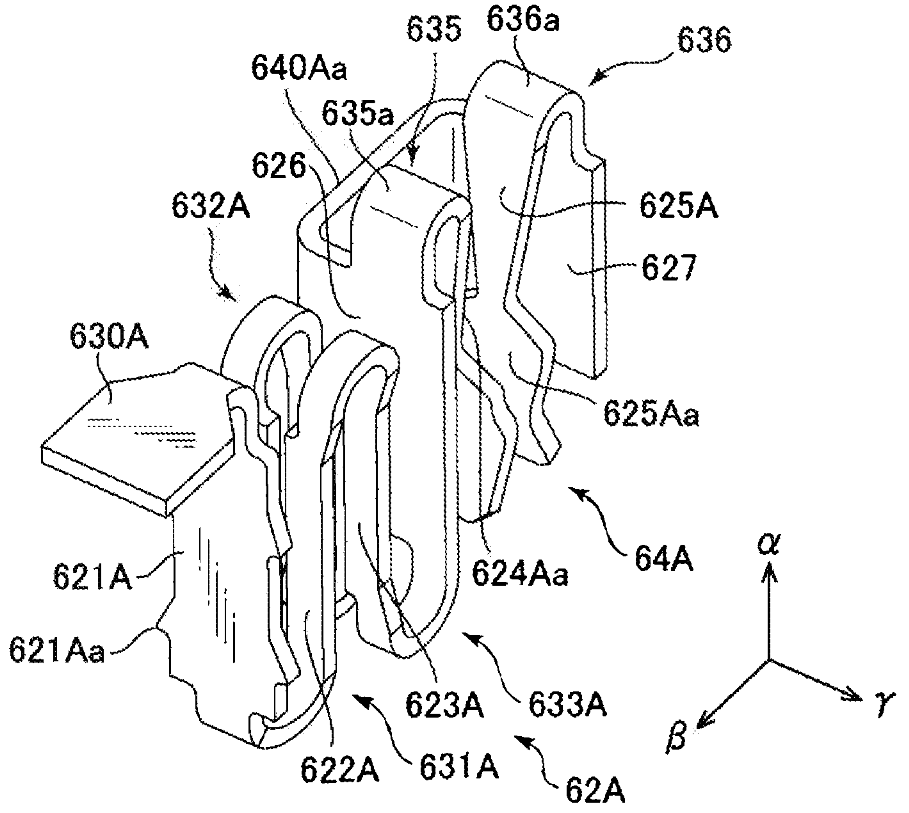
Figure 32:
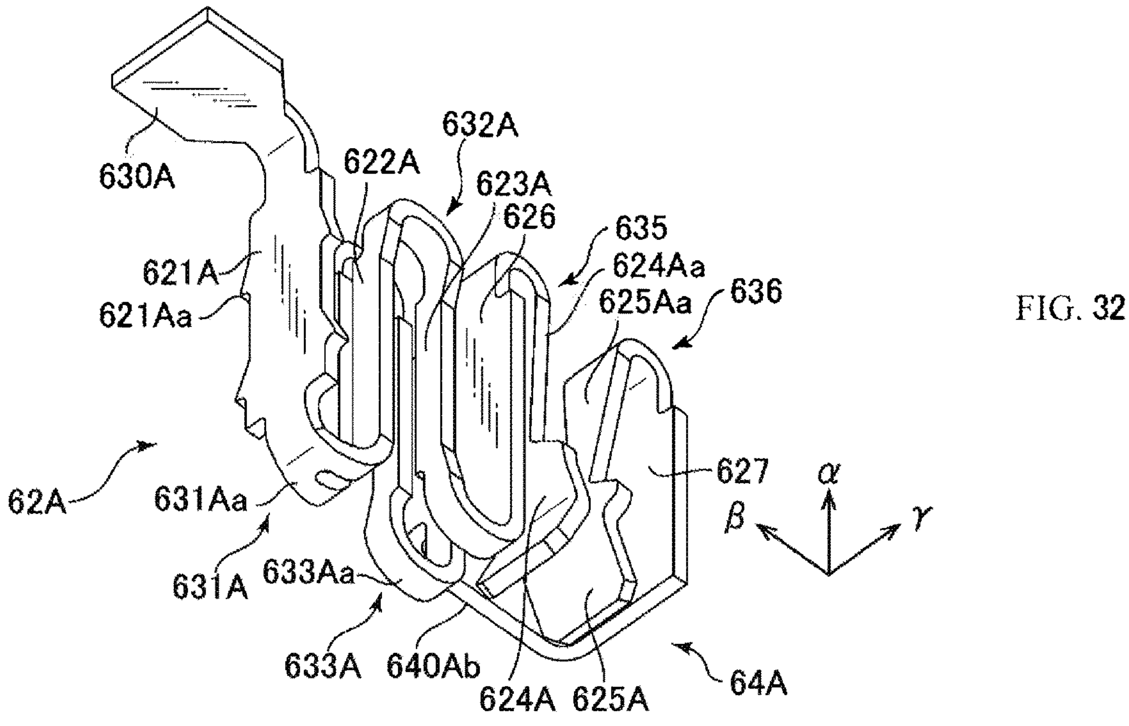
Figure 33:
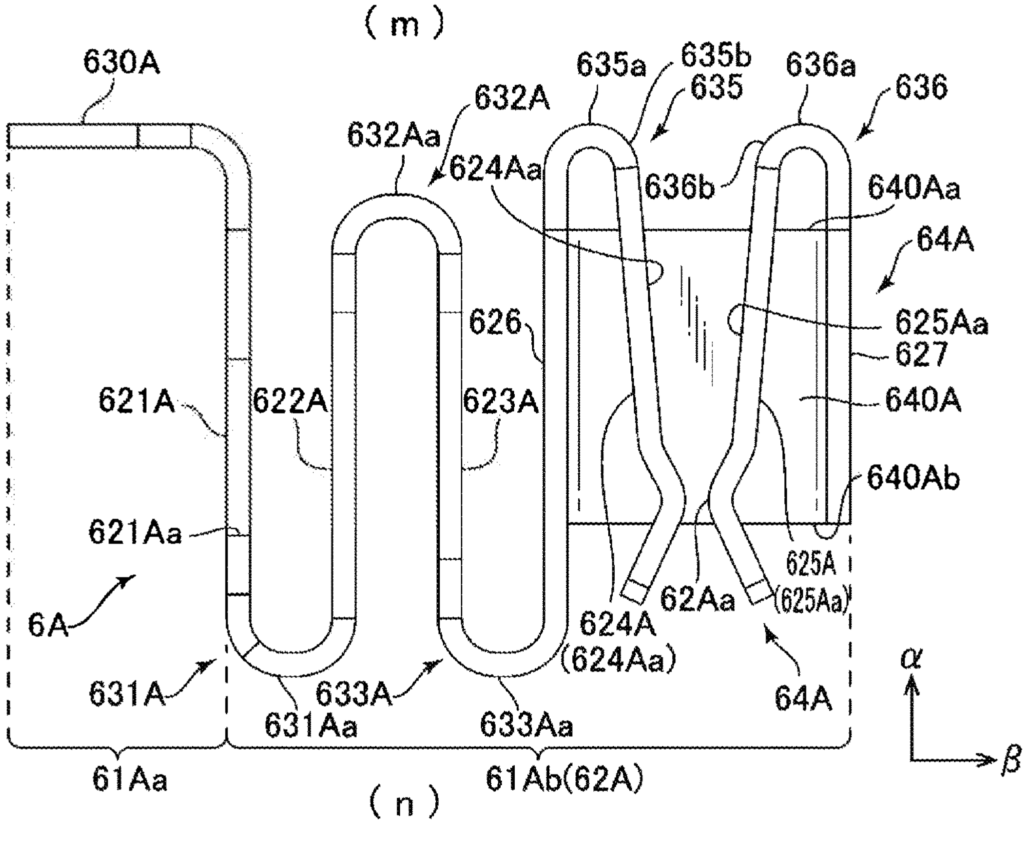
Figure 34:
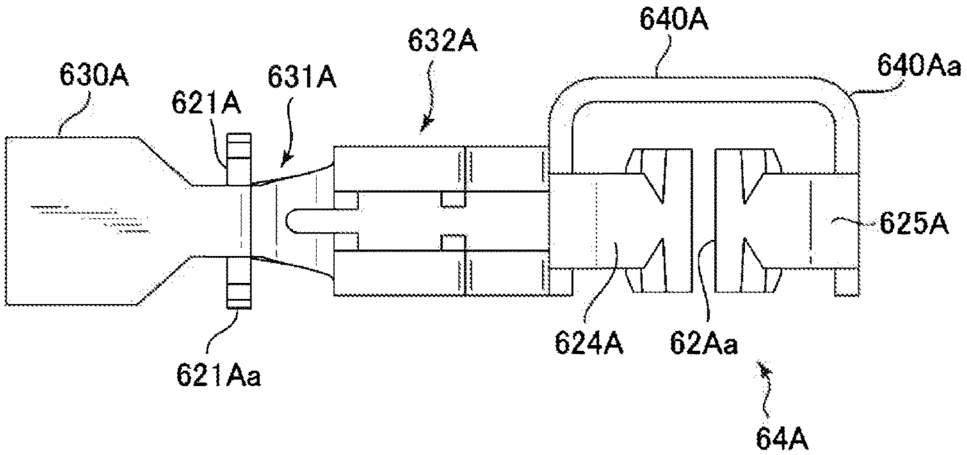

Top perspective views of the terminals 6A are shown in FIGS. 30, 31, a bottom perspective view thereof is illustrated in FIG. 32, a lateral view thereof is illustrated in FIG. 33, and, furthermore, a plan view thereof is illustrated in FIG. 34.

The terminals 6A have one end side 61Aa thereof secured to the main body of the housing 2A and are resiliently supported in a cantilever configuration. Each terminal 6A includes a base portion 621A and an anchoring portion 630A on one end side 61Aa, and comprises a resilient member 62A forming a free end on the other end side 61Ab opposite to said one end side 61Aa. When the terminals 6A are attached to the main body of the housing 2A, one end side 61Aa is positioned on one side (f) in the depth direction "β" and the other end side 61Ab is positioned on the side (b) opposite to the one side (f) in the depth direction "β".

The base portion 621A, which has press-fit projections 621Aa, is press-fittingly secured to the main body of the housing 2A by press-fitting into the respective grooves 25Aa (see FIG. 27, etc.) provided in the main body of the housing 2A. In the same manner as the anchor fittings 8A, the anchoring portion 630A is secured to a board 13 or the like.

The resilient member 62A includes a plurality of vertical sections 622A, 623A, and 626 extending between one side (m) and the other side (n) in the height direction "α", a plurality of curved sections 631A, 632A, and 633A having apex portions 631Aa, 632Aa, and 633Aa respectively on one side (m) or on the other side (n), and furthermore, a contact member 64A forming a free end at the end on the other end side 61Ab. The plurality of vertical sections 622A, 623A and the plurality of curved sections 631A, 632A, and 633A are coupled in an alternating manner and, furthermore, on the whole, these sections and the contact member 64A are coupled to one another so as to extend in the depth direction "β".

Although the vertical sections 622A, 623A, and 626 are formed as generally linear members extending between one side (m) and the other side (n) in the height direction "α", they may be inclined to a certain extent. The vertical section 626 forms part of the contact member 64A.

The curved sections 631A, 632A, and 633A, along with the vertical sections 622A, 623A, couple the contact member 64A to the one end side 61Aa of the terminals 6A and impart resilience to the contact member 64A. The curved sections 631A, 633A are formed as generally U-shaped portions, with their apex portions 631Aa, 633Aa directed toward the other side (n) in the height direction "α", in other words, toward the through-holes 22A side. Further, in the same manner as the curved sections 631A, 633A, the curved section 632A is also formed as a generally U-shaped portion, with its apex portion 632Aa directed toward the one side (m) in the height direction "α", that is, toward the insertion apertures 21A side.

The contact member 64A forms a free end at the end of the resilient member 62A. The contact member 64A includes a pair of contact pieces 624A, 625A, which are spaced apart from each other in the depth direction "β", a pair of vertical sections 626, 627, which are spaced apart from each other in the depth direction "β" while sandwiching this pair of contact pieces 624A, 625A therebetween in the depth direction "β", a plate-shaped coupling portion 640A, which extends between one side (f) and the other side (b) in the depth direction "β" and couples the vertical sections 626, 627 at an intermediate location in the height direction "α", a curved section 635, which couples the vertical section 626 and the contact piece 624A, and a curved section 636, which couples the vertical section 627 and the contact piece 625A. The contact point 62Aa with the counterpart terminals 11 are formed in a raised shape by bending this pair of contact pieces 624A, 625A in a wedge-like shape converging toward each other in the depth direction "β" at locations proximate the other side (n) in the height direction "α". As a result of bending in a wedge-like shape, the pair of contact pieces 624A, 625A form slopes converging toward each other as one moves deeper into the insertion space 20 in the height direction "α", with these inclined sections 624Aa, 625Aa drawing in and reliably guiding the counterpart terminals 11 toward the contact points 62Aa. The counterpart terminals 11 inserted into the insertion space 20 through the insertion apertures 21A are ultimately connected to the terminals 6A in a state of resilient contact with the contact points 62Aa formed by this pair of contact pieces 624A, 625A.

As best shown in FIGS. 22 and 23, when the terminals 6A are installed in the main body of the housing 2A, at least a portion of the curved sections 635, 636, for example, the portions 635*b*, 636*b*, which are somewhat closer to the insertion apertures 21A than the apex portions 635*a*, 636*a* of the curved sections 635, 636, is positioned within the bounds of the predetermined area (xA) occupied by insertion apertures 21A in the first "β-γ" plane (plane X). Thus, using the portions 635*b*, 636*b* of the curved sections 635, 636 as lead-in portions makes it possible for the counterpart terminals 11 inserted with misalignment relative to the insertion apertures 21A to be reliably led into the insertion space 20A.

As can be seen in FIGS. 22, 23, 26, 33, etc., in the present configuration, at least a portion of the resilient member 62A other than the contact points 62Aa of the terminals 6A, for example, at least portions 624Ab, 625Ab of the pair of contact pieces 624A, 625A, along with the contact points 62Aa, are positioned within the bounds of the predetermined area (xA) in the first "β-γ" plane (plane X) defined by insertion apertures 21A. In other words, the insertion apertures 21A are substantially open for the contact points 62Aa. In this case, before the counterpart terminals 11, inserted with misalignment relative to the insertion apertures 21A, make contact with the contact points 62Aa, collision with the counterpart terminals 11 takes place in sections other than the contact points 62Aa, for example, sections 624Ab, 625Ab, and, as a result of such collision, the contact member 64A, which forms a free end, is caused to move within the predetermined area (xA) under the action of the resilient member 62A and correct the misalignment, thereby allowing the counterpart terminals 11 to be brought into solid contact with the contact points 62Aa. Thus, the contact pieces 624A, 625A not only serve to lead the counterpart terminals 11 inserted through the insertion apertures 21A toward the contact points 62Aa, but also have the capability to correct misalignment through collision with the counterpart terminals 11 inserted with misalignment relative to the insertion apertures 21A.

Figure 35:
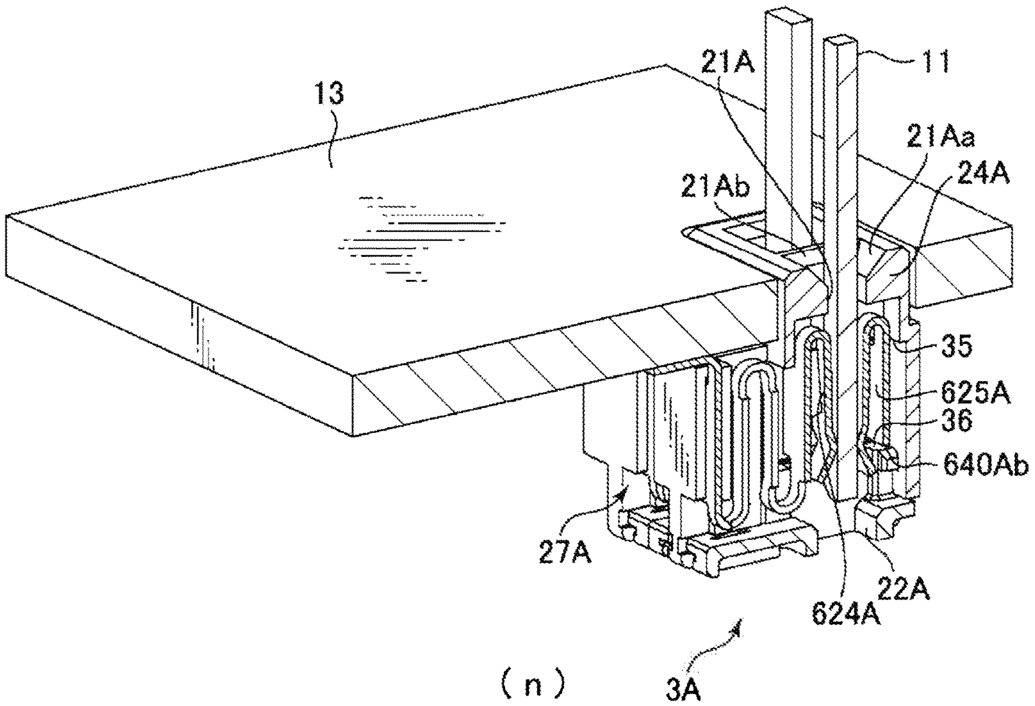

FIG. 35 shows an exemplary mode of use of the connector 1A.

FIG. 35 is a perspective cross-sectional view illustrating a state in which the counterpart terminals 11 have been inserted into the insertion space 20A through the insertion apertures 21A from one side (m) toward the other side (n) in the height direction "α" and are sandwiched by the contact points 62Aa respectively provided in the pair of contact pieces 624A, 625A, in other words, a state of full connection between the terminals 6A and the counterpart terminals 11.

In addition, in the present configuration, the resilient action of the resilient member 62A is also used to cause at least a portion of the resilient member 62A to collide with any of the inner walls of the insertion space 20A, thereby making it possible to prevent excessive displacement of the resilient member 62A. For example, as can be seen in FIG. 23, FIG. 35, etc., the edge portions 640Aa, 640Ab of the plate-shaped coupling portion 640A on one side (m) and the other side (n) in the height direction "α" are adapted for collision with any of the inner walls of the main body of the housing 2A constituting the insertion space 20A, for example, the upper stepped portion 35 and lower stepped portion 36 formed in the depth of the main body of the housing 2A. This prevents excessive displacement toward the one side (m) and the other side (n).

Reference Example

A connector according to a reference example based on the inventive concept of the present invention will be described hereinbelow. The same reference numerals are used, with the letter "B" assigned thereto, for members corresponding to the connector 1 according of the first embodiment. Matters not specifically recited herein may be construed in a manner similar to the matters relating to connector 1.

Figure 37:
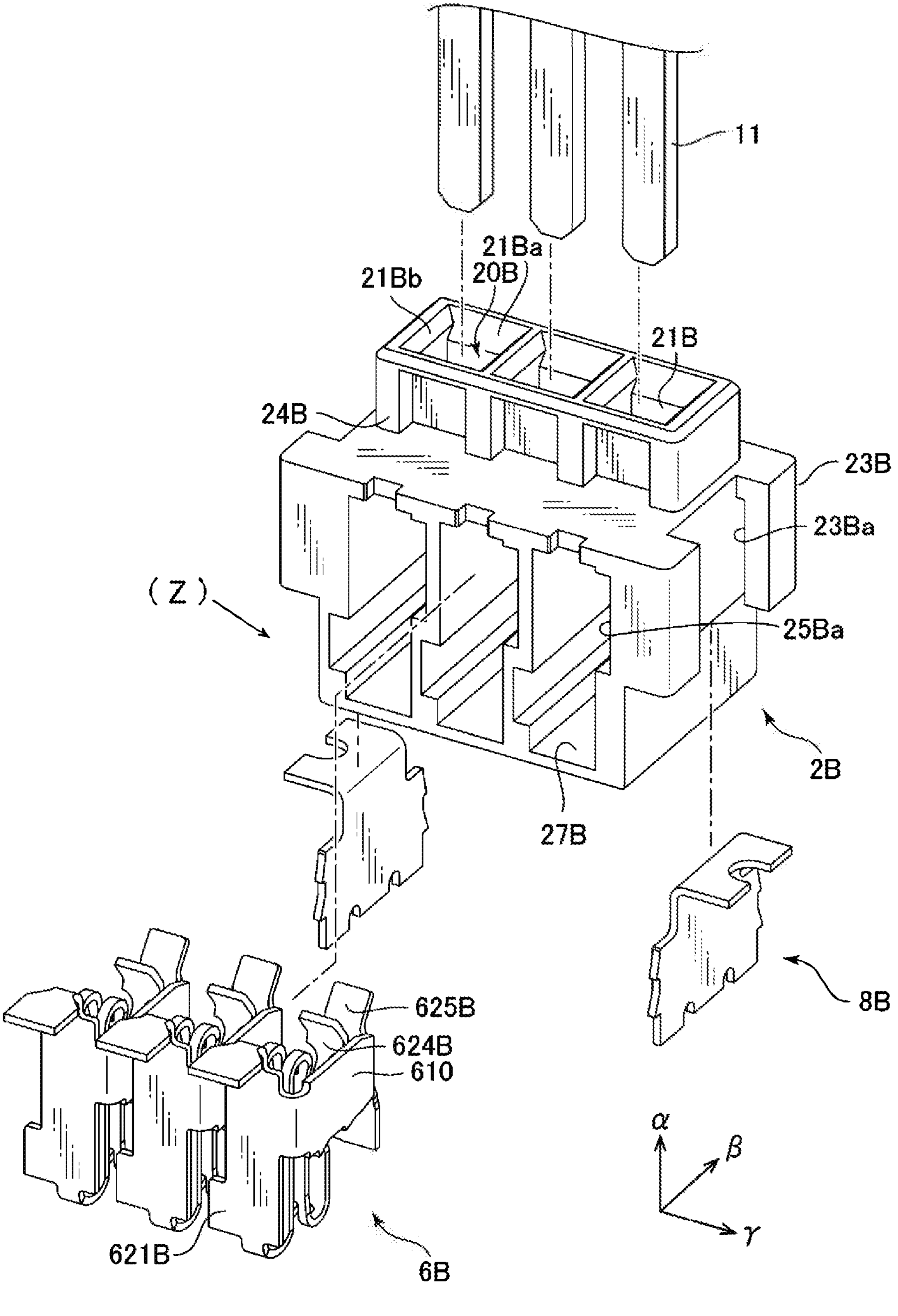
Figure 38:
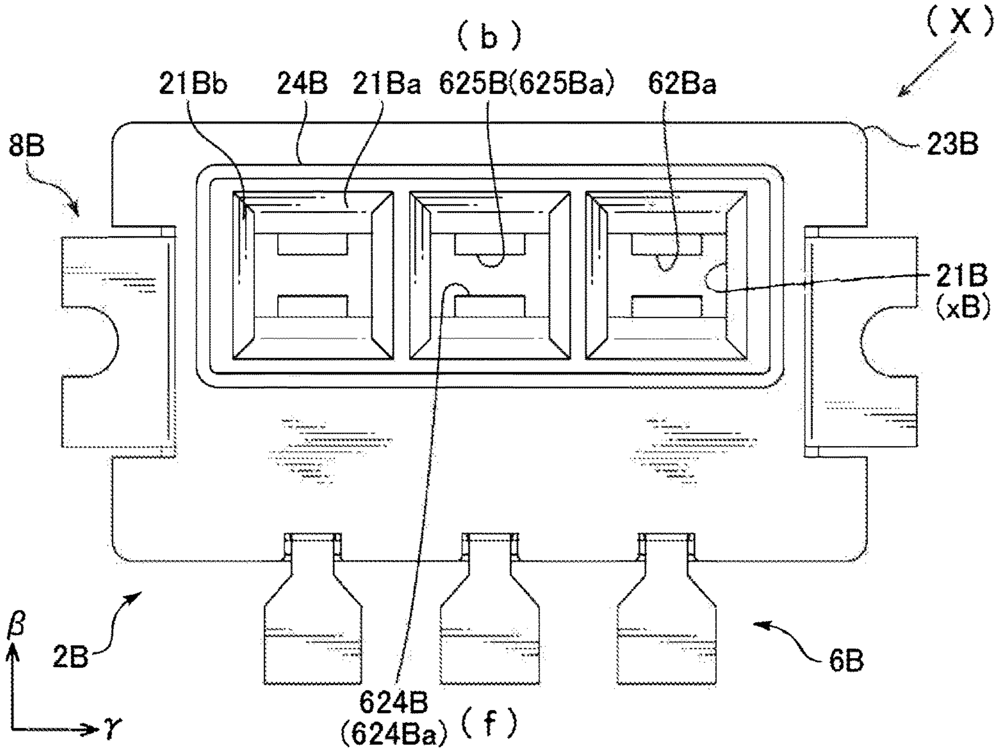
Figure 39:
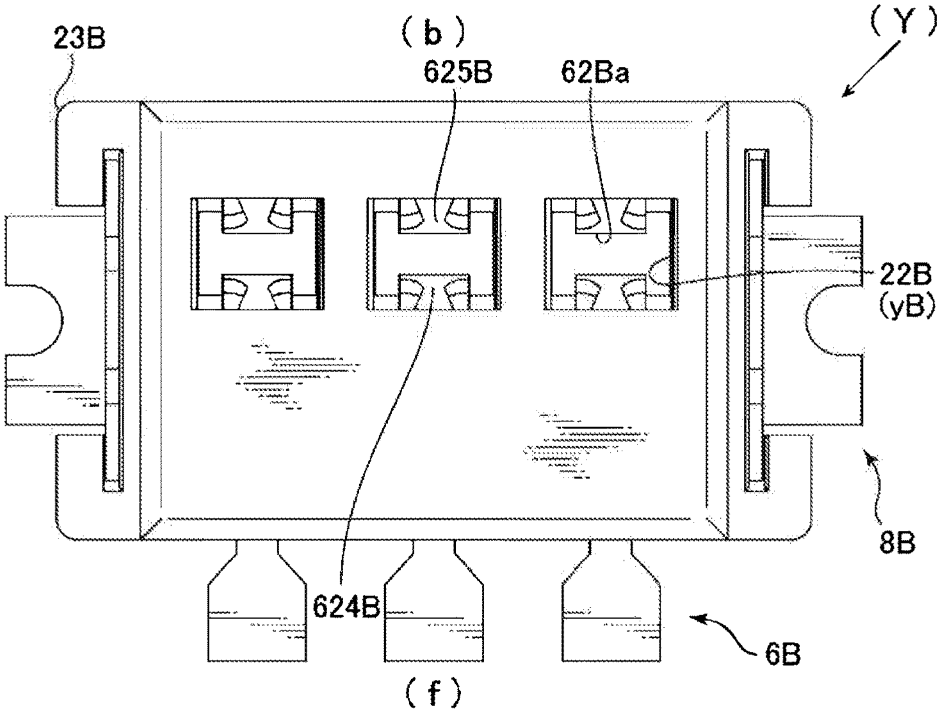

A top perspective view of a connector 1B according to a reference example is illustrated in FIG. 36, an exploded perspective view of the connector 1B of FIG. 36 is illustrated in FIG. 37, a plan view thereof is illustrated in FIG. 38, and a bottom view thereof is illustrated in FIG. 39.

The connector 1B differs from the connector 1 of the first embodiment mainly in terms of the shape of the housing 2B and the shape of the terminals 6B, as well as the direction of insertion of the counterpart terminals 11, in other words, in that it is configured with a view to insert the counterpart terminals 11 into the insertion space 20B of the housing 2B only from the one side (m) toward the other side (n). Although it should be noted that the counterpart terminals 11 can be inserted from the other side (n) toward the one side (m), this is not the intended mode of insertion. In terms of other features, the connector can be considered to be of the same or of a corresponding configuration as the connectors 1, 1A according to the first embodiment or second embodiment.

In the same manner as the connector 1 according to the first embodiment, the connector 1B includes a housing along with terminals 6A and anchor fittings 8A secured to the housing. However, the housing 2B, which is a single-piece housing, is not divided into a main body of the housing 2 and lid-shaped members 3 as in the first and second embodiments.

Figure 41:
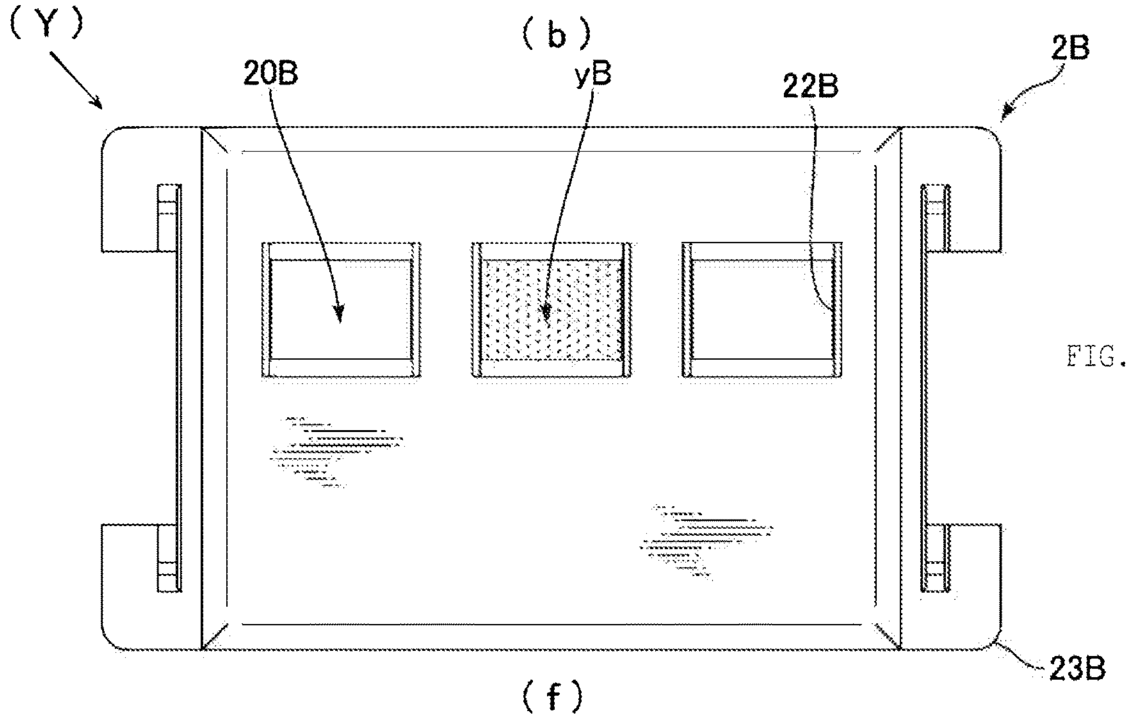

A perspective view of the housing 2B is illustrated in FIG. 40 and a bottom view thereof is illustrated in FIG. 41. The housing 2B is made of plastics. An insertion space 20B is formed in the interior of the housing 2B. Within the insertion space 20B, a portion of the terminals 6B is positioned in a state that enables contact with the inserted counterpart terminals 11 while also enabling movement in the interior of the insertion space 20B through contact with the counterpart terminals 11. Although both sides, i.e., the one side "m" and the other side (n) in the height direction "α", are respectively open in the same manner as in the first embodiment, only the one side "m" serves to provide insertion apertures 21B for inserting the counterpart terminals 11 while the other side "n" serves mainly to provide through-holes 22B that allow the counterpart terminals 11 to pass therethrough. The counterpart terminals 11 are inserted into the insertion space 20B of the housing 2B from locations spaced apart in the height direction "α" from one side (m) toward the other side (n).

The insertion apertures 21B occupy a predetermined area (xB) within the first "β-γ" plane (plane X) formed by the depth direction "β" and width direction "γ" of the housing 2B and, on the other hand, the through-holes 22B occupy a predetermined area (yB) within the substantially planar second "β-γ" plane (plane Y) formed by the same directions.

Each terminal 6B is inserted into the insertion space 20B from the other side (f) toward the one side (n) in the depth direction "β" through opening portions 27B provided only in the "α-β" plane (plane Z) and is secured at a predetermined location of the housing 2B. At such time, in the "α-β" plane (plane Z), the opening portions 27B are at least partly blocked by a portion (621B) of the terminals 6B. In this manner, each terminal 6B is attached to the housing 2B in the depth direction "β" and, in addition, unlike the first and second embodiment, no lid-shaped members are provided because the opening portions 27B of the housing 2B are blocked using the terminals 6B.

Figure 42:
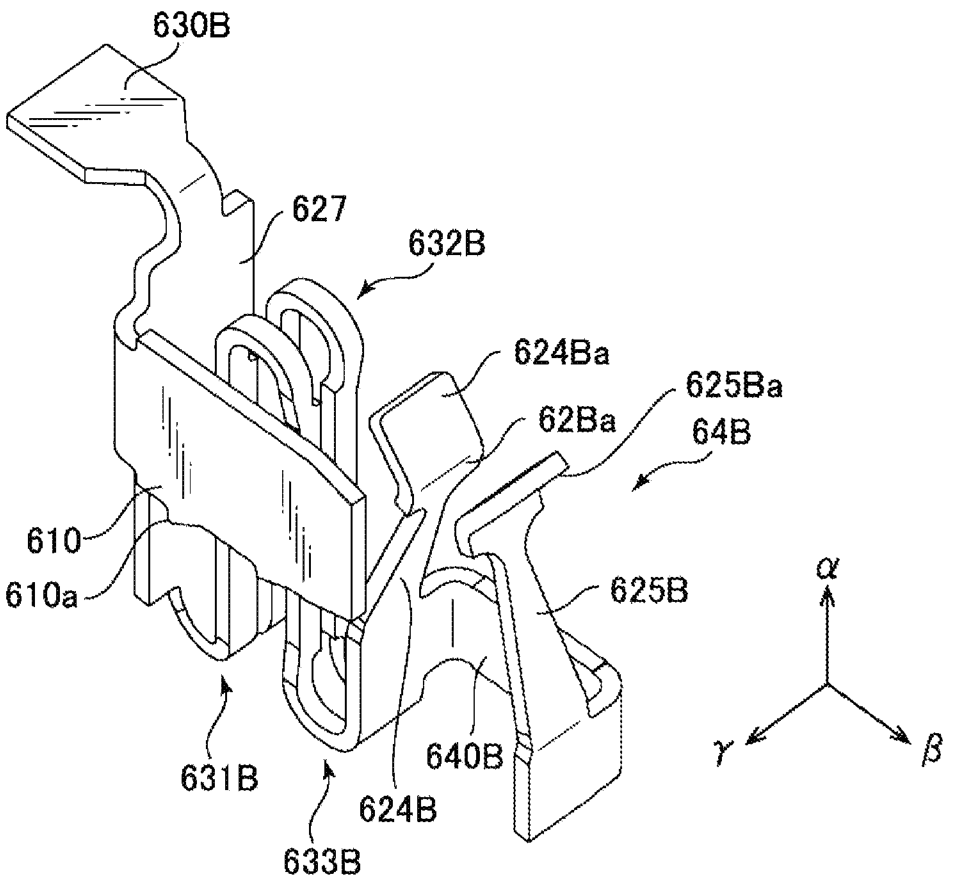
Figure 43:
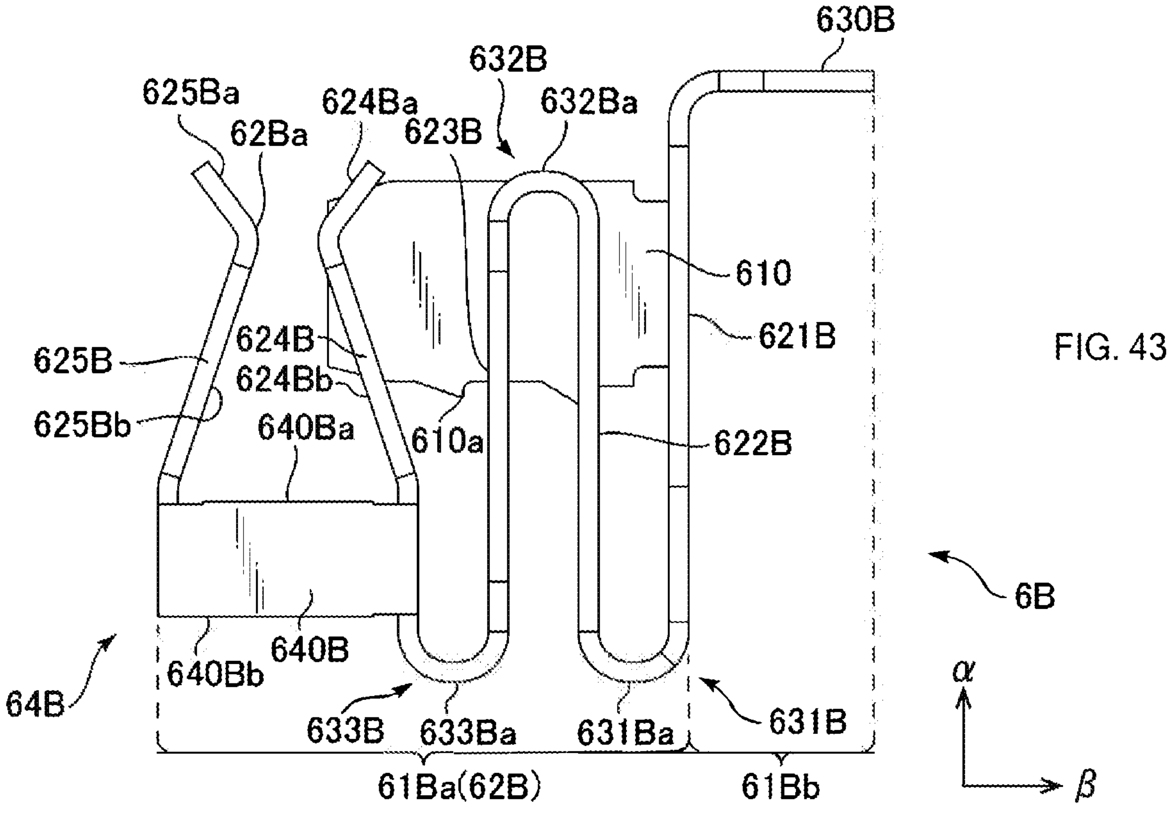
Figure 44:
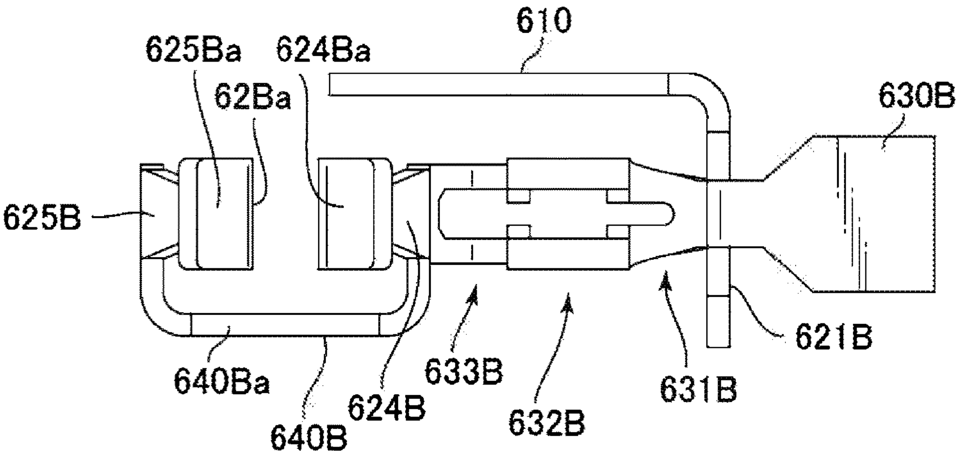
Figure 45:
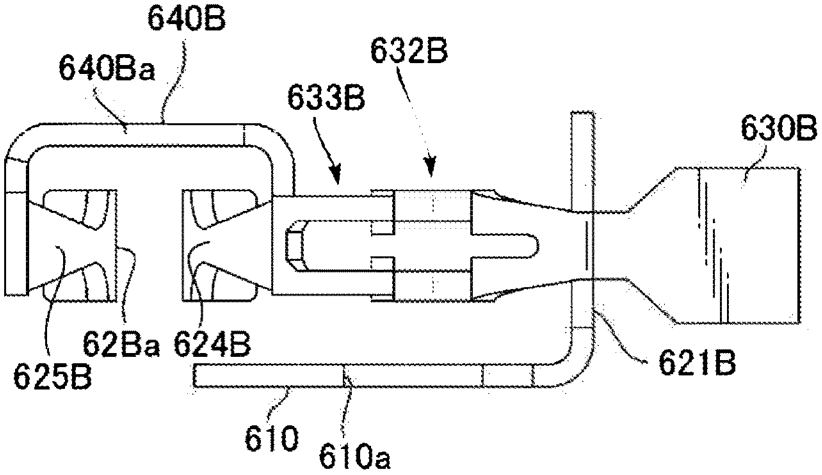

A top perspective view of a terminal 6B is illustrated in FIG. 42, a lateral view thereof is illustrated in FIG. 43, a plan view thereof is illustrated in FIG. 44, and, furthermore, a plan view thereof is illustrated in FIG. 45, respectively. The terminals 6B have one end side 61Ba thereof secured to the housing 2B and are resiliently supported in a cantilever configuration. Each terminal 6B includes a base portion 621B and an anchoring portion 630B on one end side 61Ba and comprises a resilient member 62B that forms a free end on the other end side 61Bb opposite to said one end side 61Ba. When the terminals 6B are attached to the housing 2B, one end side 61Ba is positioned on one side (f) in the depth direction "β" and the other end side 61Bb is positioned on the side (b) opposite to the one side (f) in the depth direction "β".

An anchoring plate portion 610 extends from the base portion 621B in the depth direction "β". By press-fitting the plate portions 610 having press-fit projections 610*a* into the respective grooves 25Ba (see FIGS. 36, 37, etc.) provided in the housing 2B, the terminals 6 are press-fittingly secured to the housing 2B. In the same manner as the anchor fittings 8B, the anchoring portion 630B is secured to the board 13 and the like.

The resilient member 62B includes a plurality of vertical sections 622B, 623B extending between one side (m) and the other side (n) in the height direction "α", a plurality of curved sections 631B, 632B, and 633B having apex portions 631Ba, 632Ba, and 633Ba respectively on one side (m) or on the other side (n), and furthermore, a contact member 64B forming a free end at the end on the other end side 61Bb. The plurality of vertical sections 622B, 623B and the plurality of curved sections 631B, 632B, and 633B are coupled in an alternating manner and, furthermore, on the whole, these sections and the contact member 64 are coupled to one another so as to extend in the depth direction "β".

Although the vertical sections 622B, 623B are formed as generally linear members extending between one side (m) and the other side (n) in the height direction "α", they may be inclined to a certain extent.

The curved sections 631B, 632B, and 633B, along with the vertical sections 622B, 623B, couple the contact member 64B to the one end side 61Ba of the terminals 6B and impart resilience to the contact member 64B. The curved sections 631B, 633B are formed as generally U-shaped portions, with their apex portions 631Ba, 633Ba directed toward the other side (n) in the height direction "α", that is, toward the through-holes 22B. Further, in the same manner as the curved sections 631B, 633B, the curved section 632B is also formed as a generally U-shaped portion, with its apex portion 632Ba directed toward the one side (m) in the height direction "α", that is, toward the insertion apertures 21B.

The contact member 64B forms a free end at the end of the resilient member 62B. The contact member 64B includes a pair of contact pieces 624B, 625B spaced apart from each other in the depth direction "β" and a plate-shaped coupling portion 640B, which extends between one side (f) and the other side (b) in the depth direction "β" and couples the pair of contact pieces 624B, 625B at the end portion of one side (n) in the height direction "α". The contact points 62Ba with the counterpart terminals 11 are formed in a raised shape by bending this pair of contact pieces 624B, 625B in a wedge-like shape converging toward each other in the depth direction "β" at locations proximate the one side (m) in the height direction "α". As a result of bending in a wedge-like shape, the pair of contact pieces 624B, 625B form slopes converging toward each other as one moves deeper into the insertion space 20B in the height direction "α", with these inclined sections 624Ba, 625Ba drawing in and reliably guiding the counterpart terminals 11 toward the contact points 62Ba. The counterpart terminals 11 inserted into the insertion space 20B through the insertion apertures 21B are ultimately connected to the terminals 6B in a state of resilient contact with the contact points 62Ba formed by this pair of contact pieces 624B, 625B.

As can be seen in FIGS. 38 through 41, etc., in the present configuration, at least a portion of the resilient member 62B other than the contact points 62Ba of the terminals 6B, for example, at least portions 624Bb, 625Bb of the pair of contact pieces 624B, 625B, along with the contact points 62Ba, are positioned within the bounds of the predetermined area (xB) in the first "β-γ" plane (plane X) defined by insertion apertures 21B and, in addition, are positioned within the bounds of the predetermined area (yB) in the second "β-γ" plane (plane Y) defined by insertion apertures 22B. In other words, the insertion apertures 21B and through-holes 22B are substantially open for the contact points 62Ba. In this case, before the counterpart terminals 11, inserted with misalignment relative to the insertion apertures 21B (and/or through-holes 22B), make contact with the contact points 62Ba, collision with the counterpart terminals 11 takes place in sections other than the contact points 62Ba, for example, sections 624Bb, 625Bb, and, as a result of such collision, the contact member 64B, which forms a free end, is caused to move within the predetermined area (xB) or (yB) under the action of the resilient member 62B and correct the misalignment, thereby allowing the counterpart terminals 11 to be brought into solid contact with the contact points 62Ba. Thus, the contact pieces 624B, 625B not only serve to lead the counterpart terminals 11 inserted through the insertion apertures 21B (or through-holes 22B) toward the contact points 62Ba, but also have the capability to correct misalignment through collision with the counterpart terminals 11 inserted with misalignment relative to the insertion apertures 21B (or through-holes 22B).

Figure 46:
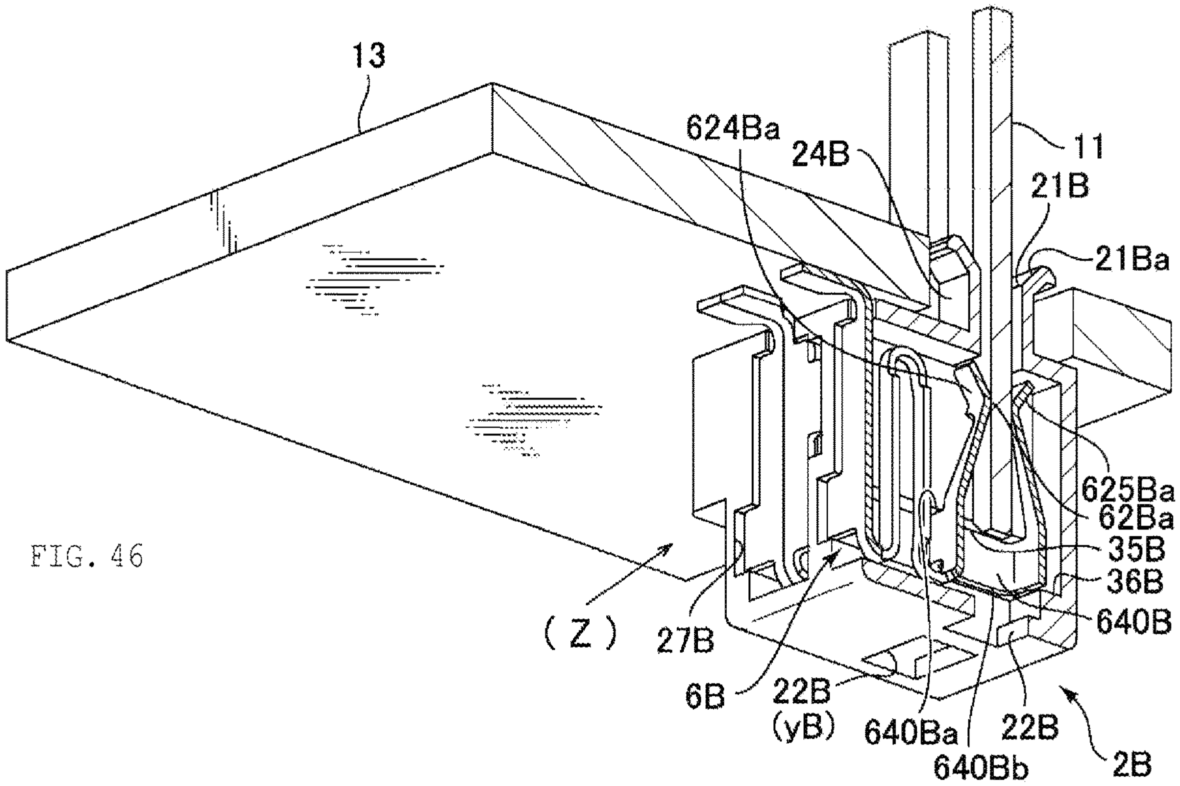
Figure 47:
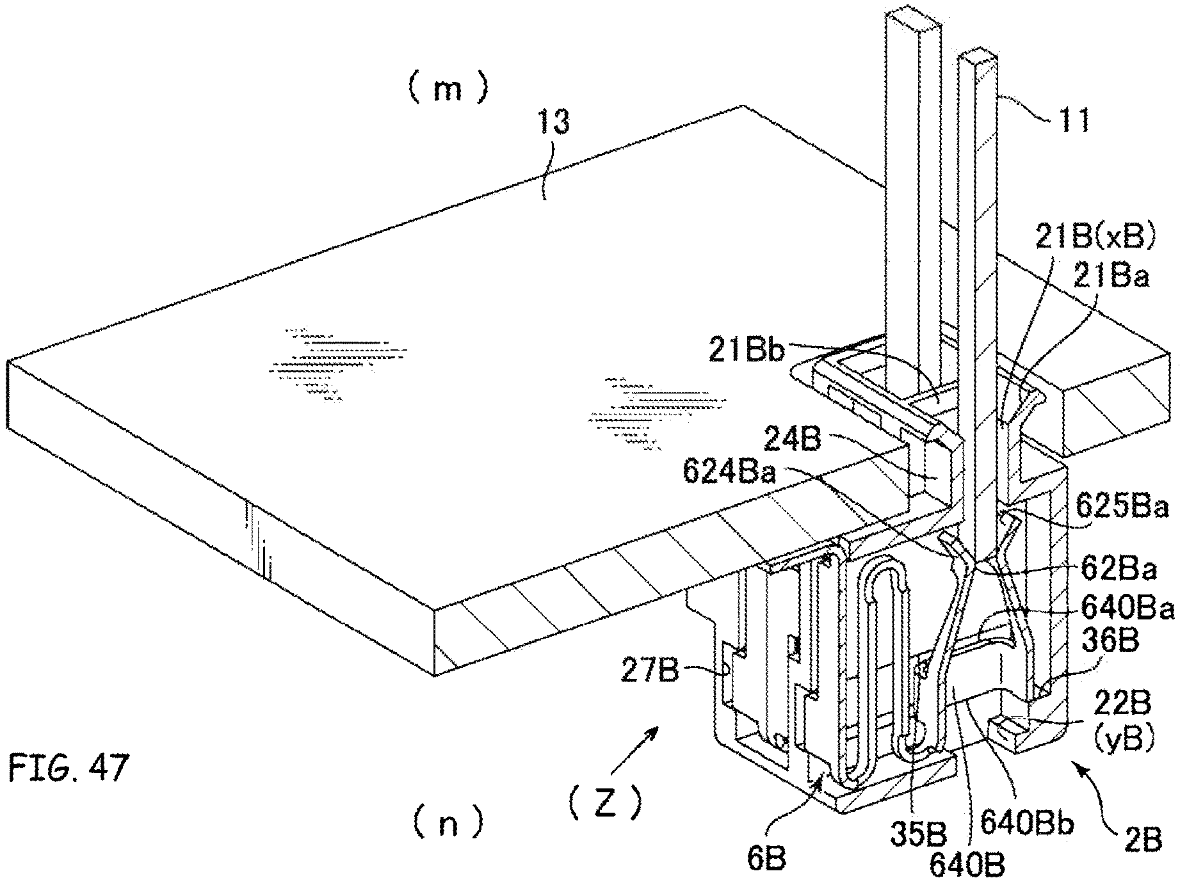

An exemplary mode of use of the connector 1B is illustrated in FIG. 46 and FIG. 47.

FIG. 46 is a perspective cross-sectional view illustrating a state in which the counterpart terminals 11 have been inserted into the insertion space 20B through the insertion apertures 21B from one side (m) toward the other side (n) in the height direction "α" and are sandwiched by the contact points 62Ba respectively provided in the pair of contact pieces 624B, 625B, in other words, a state of full connection between the terminals 6B and the counterpart terminals 11.

On the other hand, FIG. 47, which is a lateral cross-sectional view illustrating a state before the terminals 6B are fully connected to the counterpart terminals 11, in other words, a view used to explain a configuration intended to prevent excessive displacement of the resilient member 62B, shows a state in which the counterpart terminals 11B have been inserted through the insertion apertures 21B from one side (m) toward the other side (n) in the height direction "α", and have collided with the pair of contact pieces 624B, 625B.

In addition, in the present configuration, the resilient action of the resilient member 62B is also used to cause at least a portion of the resilient member 62B to collide with any of the inner walls of the insertion space 20B, thereby making it possible to prevent excessive displacement of the resilient member 62B. For example, as can be seen in FIG. 46, FIG. 47, etc., the edge portions 640Ba, 640Bb of the plate-shaped coupling portion 640B on one side (m) and the other side (n) in the height direction "α" are adapted for collision with any of the inner walls of the housing 2B constituting the insertion space 20B, for example, the stepped portion 35B or the bottom inner wall 36B formed in the depth of the housing 2B. This prevents excessive displacement toward the one side (m) and the other side (n).

It is to be appreciated that the foregoing discussion is of the preferred embodiments and is merely representative of the article. It can be appreciated that variations and modifications of the different embodiments, in light of the above teachings, will be readily apparent to a person of skill in the art. Accordingly, exemplary embodiments, as well as alternative embodiments, can be made without departing from the spirit of the articles and methods set forth in the appended claims.

DESCRIPTION OF THE REFERENCE NUMERALS

1 Connector
2 Main body of the housing (housing)
3 Lid-shaped member (housing)
6 Terminal
8 Anchor fitting
11. Counterpart terminal
13 Board
20 Insertion space
21 Insertion apertures (first insertion apertures)
22 Insertion apertures (second insertion apertures)
62 Resilient member
62*a* Contact point
64 Contact member
622, 623 Vertical sections
624, 625 Contact pieces
631, 632, 633, 634 Curved sections
633*a*, 634*a* Apex portions
640 Plate-shaped coupling portion
640*a* Edge portions
x, y Predetermined areas
X First plane
Y Second plane

The invention claimed is:

1. A connector comprising:

a housing having a height direction, a width direction, and a depth direction, and cantilevered terminals having one end side secured to the housing on one side in the depth direction and having a resilient member forming a free end in an end portion on the other end side opposite to said one end side on the side opposite to the one side in the depth direction, wherein counterpart terminals are configured to be inserted into an insertion space within the housing from locations spaced apart in the height direction through insertion apertures occupying a predetermined area in a plane formed by the depth direction and width direction of the housing, the resilient member has contact points that make contact with the counterpart terminals inserted through the insertion apertures, and at least a portion of the resilient member other than the contact points, along with the contact points, is positioned within the bounds of the predetermined area in at least the plane, wherein the resilient member comprises curved sections having lead-in portions that are formed as part of the curved sections, the lead-in portions being positioned within the predetermined area to guide misaligned counterpart terminals into the insertion apertures to correct the misalignment, wherein the resilient member includes a plurality of vertical sections extending between one side and the other side in the height direction, a plurality of curved sections having apex portions respectively on one side or on the other side in the height direction, and a contact member, which forms a free end on the other end side and has the contact points, and wherein the plurality of vertical sections and the plurality of curved sections are coupled in an alternating manner.

2. The connector according to claim 1, wherein at least a portion is positioned such that the counterpart terminals inserted through the insertion apertures can collide with said counterpart terminals before making contact with the contact points and the free end can be moved within the predetermined area.

3. The connector according to claim 1, wherein the contact member includes a pair of contact pieces spaced apart from each other in the depth direction.

4. The connector according to claim 3, wherein the contact points are formed by bending portions of the pair of contact pieces in a wedge-like shape converging toward each other in the depth direction.

5. The connector according to claim 3, wherein at least a portion of the resilient member is configured to enable collision with any inner walls within the insertion space.

6. The connector according to claim 5, wherein at least a portion of the plurality of curved sections is configured to enable collision with any of the inner walls within the insertion space.

7. The connector according to claim 5, wherein the pair of contact pieces are coupled in an end portion on one side in the height direction using a plate-shaped supporting portion extending between one side and the other side in the depth direction.

8. The connector according to claim 7, wherein the pair of contact pieces and an edge portion on one side in the height direction of the plate-shaped supporting portion can collide with any of the inner walls of the insertion space.

9. The connector according to claim 5, wherein the pair of contact pieces are coupled to the vertical sections using the curved sections and the pair of vertical sections respectively coupled to the pair of contact pieces are coupled at an intermediate location in the height direction using a plate-shaped coupling portion extending between one side and the other side in the depth direction.

10. The connector according to claim 9, wherein edge portions of the plate-shaped coupling portion on one side and the other side in the height direction can collide with any of the inner walls of the insertion space.

11. The connector according to claim 1, wherein the apex portion of at least one of the curved sections is disposed in a state directed toward the insertion apertures side while at least a portion of at least one of the curved sections, along with the contact points, is positioned within the bounds of the predetermined area in the above-mentioned plane.

12. The connector according to claim 1, wherein the insertion apertures include first insertion apertures, in which the counterpart terminals are inserted from one side toward the other side in the height direction, and second insertion apertures, in which the counterpart terminals are inserted from the other side toward the one side in the height direction.

13. The connector according to claim 1, wherein opening portions used to place a portion of the terminals into the insertion space are provided in a plane formed by the depth direction and width direction of the housing.

14. The connector according to claim 13, wherein the opening portions are blocked at least a portion of the terminals with the help of members forming part of the housing that are configured to slide in the depth direction.

* * * * *